US009003374B2

(12) United States Patent
Ngo

(10) Patent No.: US 9,003,374 B2
(45) Date of Patent: **\*Apr. 7, 2015**

(54) SYSTEMS AND METHODS FOR CONTINUOUS DATA REPLICATION

(71) Applicant: CommVault Systems, Inc., Oceanport, NJ (US)

(72) Inventor: David Ngo, Shrewsbury, NJ (US)

(73) Assignee: CommVault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,506

(22) Filed: May 5, 2014

(65) Prior Publication Data

US 2014/0244586 A1    Aug. 28, 2014

Related U.S. Application Data

(63) Continuation of application No. 11/645,048, filed on Dec. 21, 2006, now Pat. No. 8,726,242.

(60) Provisional application No. 60/833,651, filed on Jul. 27, 2006.

(51) Int. Cl.
| G06F 9/44 | (2006.01) |
|---|---|
| G06F 7/00 | (2006.01) |
| G06F 17/30 | (2006.01) |
| G06F 11/20 | (2006.01) |

(52) U.S. Cl.
CPC ...... *G06F 17/30174* (2013.01); *G06F 11/2097* (2013.01); *G06F 11/2038* (2013.01); *G06F 11/2048* (2013.01); *G06F 2201/82* (2013.01); *G06F 2201/84* (2013.01)

(58) Field of Classification Search
CPC ............ G06F 11/1446; G06F 11/1451; G06F 11/1469; G06F 11/1471; G06F 17/30088
USPC .................................. 717/127; 707/648–649
See application file for complete search history.

(56) References Cited

U.S. PATENT DOCUMENTS

| 4,296,465 A | 10/1981 | Lemak |
|---|---|---|
| 4,686,620 A | 8/1987 | Ng |

(Continued)

FOREIGN PATENT DOCUMENTS

| AU | 2006331932 | 12/2006 |
|---|---|---|
| CA | 2632935 | 12/2006 |

(Continued)

OTHER PUBLICATIONS

IBM, "Intelligent selection of logs required during recovery processing," 2002, 4pg.*
IBM, "Near Zero Impact Backup and Data Replication Appliance", 2004, 4pg.*
Park et al., "An Efficient Logging Scheme for Recoverable Distributed Shared Memory Systems," IEEE, 1997, 8pg.*
U.S. Appl. No. 14/038,540, filed Sep. 26, 2013, Erofeev.

(Continued)

*Primary Examiner* — Ryan Coyer
(74) *Attorney, Agent, or Firm* — Knobbe, Martens, Olson & Bear, LLP

(57) ABSTRACT

Systems and methods for intelligent data replication are provided, which may include the identification and use of consistency points in application data, such that one or more replication volumes may be created using an "application aware" replication process that allows the system to intelligently replicate data or other information (e.g., metadata) relating to a particular process, application or specified set of data.

20 Claims, 9 Drawing Sheets

(56) References Cited

U.S. PATENT DOCUMENTS

| | | | |
|---|---|---|---|
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,231,668 | A * | 7/1993 | Kravitz .......... 380/28 |
| 5,239,647 | A | 8/1993 | Anglin et al. |
| 5,241,668 | A | 8/1993 | Eastridge et al. |
| 5,241,670 | A * | 8/1993 | Eastridge et al. .......... 714/1 |
| 5,263,154 | A | 11/1993 | Eastridge et al. |
| 5,265,159 | A | 11/1993 | Kung |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,301,351 | A | 4/1994 | Jippo |
| 5,311,509 | A | 5/1994 | Heddes et al. |
| 5,317,731 | A | 5/1994 | Dias et al. |
| 5,321,816 | A | 6/1994 | Rogan et al. |
| 5,333,315 | A | 7/1994 | Saether et al. |
| 5,347,653 | A | 9/1994 | Flynn et al. |
| 5,369,757 | A | 11/1994 | Spiro et al. |
| 5,403,639 | A | 4/1995 | Belsan et al. |
| 5,410,700 | A | 4/1995 | Fecteau et al. |
| 5,448,724 | A | 9/1995 | Hayashi et al. |
| 5,455,926 | A | 10/1995 | Keele et al. |
| 5,487,072 | A | 1/1996 | Kant |
| 5,491,810 | A | 2/1996 | Allen |
| 5,495,607 | A | 2/1996 | Pisello et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,546,536 | A | 8/1996 | Davis et al. |
| 5,555,404 | A | 9/1996 | Torbjornsen et al. |
| 5,559,957 | A | 9/1996 | Balk |
| 5,559,991 | A | 9/1996 | Kanfi |
| 5,598,546 | A | 1/1997 | Blomgren |
| 5,604,862 | A | 2/1997 | Midgely et al. |
| 5,606,693 | A | 2/1997 | Nilsen et al. |
| 5,615,392 | A | 3/1997 | Harrison et al. |
| 5,619,644 | A | 4/1997 | Crockett et al. |
| 5,638,509 | A | 6/1997 | Dunphy et al. |
| 5,642,496 | A | 6/1997 | Kanfi |
| 5,668,986 | A | 9/1997 | Nilsen et al. |
| 5,673,381 | A | 9/1997 | Huai et al. |
| 5,675,511 | A | 10/1997 | Prasad et al. |
| 5,677,900 | A | 10/1997 | Nishida et al. |
| 5,682,513 | A | 10/1997 | Candelaria et al. |
| 5,687,343 | A | 11/1997 | Fecteau et al. |
| 5,689,706 | A | 11/1997 | Rao et al. |
| 5,699,361 | A | 12/1997 | Ding et al. |
| 5,719,786 | A | 2/1998 | Nelson et al. |
| 5,720,026 | A | 2/1998 | Uemura et al. |
| 5,729,743 | A | 3/1998 | Squibb |
| 5,737,747 | A | 4/1998 | Vishlitzky et al. |
| 5,742,792 | A | 4/1998 | Yanai et al. |
| 5,751,997 | A | 5/1998 | Kullick et al. |
| 5,758,359 | A | 5/1998 | Saxon |
| 5,761,677 | A | 6/1998 | Senator et al. |
| 5,761,734 | A | 6/1998 | Pfeffer et al. |
| 5,764,972 | A | 6/1998 | Crouse et al. |
| 5,765,173 | A | 6/1998 | Cane et al. |
| 5,778,395 | A | 7/1998 | Whiting et al. |
| 5,790,114 | A | 8/1998 | Geaghan et al. |
| 5,790,828 | A | 8/1998 | Jost |
| 5,805,920 | A | 9/1998 | Sprenkle et al. |
| 5,812,398 | A | 9/1998 | Nielsen |
| 5,813,009 | A | 9/1998 | Johnson et al. |
| 5,813,017 | A | 9/1998 | Morris |
| 5,829,046 | A | 10/1998 | Tzelnic et al. |
| 5,860,104 | A | 1/1999 | Witt et al. |
| 5,875,478 | A | 2/1999 | Blumenau |
| 5,875,481 | A | 2/1999 | Ashton et al. |
| 5,878,408 | A | 3/1999 | Van Huben et al. |
| 5,887,134 | A | 3/1999 | Ebrahim |
| 5,901,327 | A | 5/1999 | Ofek |
| 5,907,621 | A | 5/1999 | Bachman et al. |
| 5,907,672 | A | 5/1999 | Matze et al. |
| 5,924,102 | A | 7/1999 | Perks |
| 5,926,836 | A | 7/1999 | Blumenau |
| 5,933,104 | A | 8/1999 | Kimura |
| 5,933,601 | A | 8/1999 | Fanshier et al. |
| 5,950,205 | A | 9/1999 | Aviani, Jr. |
| 5,956,519 | A | 9/1999 | Wise et al. |
| 5,958,005 | A | 9/1999 | Thorne et al. |
| 5,970,233 | A | 10/1999 | Liu et al. |
| 5,970,255 | A | 10/1999 | Tran et al. |
| 5,974,563 | A | 10/1999 | Beeler, Jr. |
| 5,987,478 | A | 11/1999 | See et al. |
| 5,991,779 | A | 11/1999 | Bejar |
| 5,995,091 | A | 11/1999 | Near et al. |
| 6,003,089 | A | 12/1999 | Shaffer et al. |
| 6,009,274 | A | 12/1999 | Fletcher et al. |
| 6,012,090 | A | 1/2000 | Chung et al. |
| 6,021,415 | A | 2/2000 | Cannon et al. |
| 6,021,475 | A | 2/2000 | Nguyen et al. |
| 6,023,710 | A | 2/2000 | Steiner et al. |
| 6,026,414 | A | 2/2000 | Anglin |
| 6,049,889 | A | 4/2000 | Steely, Jr. et al. |
| 6,052,735 | A | 4/2000 | Ulrich et al. |
| 6,058,066 | A | 5/2000 | Norris et al. |
| 6,061,692 | A | 5/2000 | Thomas et al. |
| 6,072,490 | A | 6/2000 | Bates et al. |
| 6,076,148 | A | 6/2000 | Kedem et al. |
| 6,088,697 | A | 7/2000 | Crockett et al. |
| 6,094,416 | A | 7/2000 | Ying |
| 6,105,129 | A | 8/2000 | Meier et al. |
| 6,112,239 | A | 8/2000 | Kenner et al. |
| 6,122,668 | A | 9/2000 | Teng et al. |
| 6,131,095 | A | 10/2000 | Low et al. |
| 6,131,148 | A | 10/2000 | West et al. |
| 6,131,190 | A | 10/2000 | Sidwell |
| 6,137,864 | A | 10/2000 | Yaker |
| 6,148,377 | A | 11/2000 | Carter et al. |
| 6,148,412 | A | 11/2000 | Cannon et al. |
| 6,154,787 | A | 11/2000 | Urevig et al. |
| 6,154,852 | A | 11/2000 | Amundson et al. |
| 6,158,044 | A | 12/2000 | Tibbetts |
| 6,161,111 | A | 12/2000 | Mutalik et al. |
| 6,163,856 | A | 12/2000 | Dion et al. |
| 6,167,402 | A | 12/2000 | Yeager |
| 6,175,829 | B1 | 1/2001 | Li et al. |
| 6,195,695 | B1 | 2/2001 | Cheston et al. |
| 6,205,450 | B1 | 3/2001 | Kanome et al. |
| 6,212,512 | B1 | 4/2001 | Barney et al. |
| 6,212,521 | B1 | 4/2001 | Minami et al. |
| 6,230,164 | B1 | 5/2001 | Rekieta et al. |
| 6,260,068 | B1 | 7/2001 | Zalewski et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,279,078 | B1 | 8/2001 | Sicola et al. |
| 6,292,783 | B1 | 9/2001 | Rohler |
| 6,301,592 | B1 | 10/2001 | Aoyama et al. |
| 6,304,880 | B1 | 10/2001 | Kishi |
| 6,311,193 | B1 | 10/2001 | Sekido et al. |
| 6,324,581 | B1 | 11/2001 | Xu et al. |
| 6,328,766 | B1 | 12/2001 | Long |
| 6,330,570 | B1 | 12/2001 | Crighton |
| 6,330,642 | B1 | 12/2001 | Carteau |
| 6,343,324 | B1 | 1/2002 | Hubis et al. |
| 6,350,199 | B1 | 2/2002 | Williams et al. |
| RE37,601 | E * | 3/2002 | Eastridge et al. .......... 714/6.3 |
| 6,353,878 | B1 | 3/2002 | Dunham |
| 6,356,801 | B1 | 3/2002 | Goodman et al. |
| 6,363,464 | B1 | 3/2002 | Mangione |
| 6,366,986 | B1 | 4/2002 | St. Pierre et al. |
| 6,366,988 | B1 | 4/2002 | Skiba et al. |
| 6,374,336 | B1 | 4/2002 | Peters et al. |
| 6,374,363 | B1 | 4/2002 | Wu et al. |
| 6,389,432 | B1 | 5/2002 | Pothapragada et al. |
| 6,397,308 | B1 | 5/2002 | Ofek et al. |
| 6,418,478 | B1 | 7/2002 | Ignatius et al. |

(56) References Cited

U.S. PATENT DOCUMENTS

| | | |
|---|---|---|
| 6,421,711 B1 | 7/2002 | Blumenau et al. |
| 6,434,681 B1 | 8/2002 | Armangau |
| 6,438,595 B1 | 8/2002 | Blumenau et al. |
| 6,466,950 B1 | 10/2002 | Ono |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,516,314 B1 | 2/2003 | Birkler et al. |
| 6,516,327 B1 | 2/2003 | Zondervan et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,468 B1 | 4/2003 | Hatakeyama |
| 6,542,909 B1 | 4/2003 | Tamer et al. |
| 6,542,972 B2 | 4/2003 | Ignatius et al. |
| 6,564,228 B1 | 5/2003 | O'Connor |
| 6,564,229 B1 | 5/2003 | Baweja et al. |
| 6,564,271 B2 | 5/2003 | Micalizzi, Jr. et al. |
| 6,581,143 B2 | 6/2003 | Gagne et al. |
| 6,604,118 B2 | 8/2003 | Kleiman et al. |
| 6,604,149 B1 | 8/2003 | Deo et al. |
| 6,611,849 B1 | 8/2003 | Raff et al. |
| 6,615,223 B1 | 9/2003 | Shih et al. |
| 6,629,189 B1 | 9/2003 | Sandstrom |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,691,209 B1 | 2/2004 | O'Connell |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,472 B1 | 9/2004 | Otterness et al. |
| 6,792,518 B2 | 9/2004 | Armangau et al. |
| 6,799,258 B1 | 9/2004 | Linde |
| 6,820,035 B1 | 11/2004 | Zahavi |
| 6,836,779 B2 | 12/2004 | Poulin |
| 6,839,724 B2 | 1/2005 | Manchanda et al. |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 | 6/2005 | Kaiser |
| 6,925,476 B1 | 8/2005 | Multer et al. |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,705 B2 | 10/2005 | Knoblock et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,007,046 B2 | 2/2006 | Manley et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,068,597 B1 | 6/2006 | Fijolek et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,093,012 B2 | 8/2006 | Olstad et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,107,395 B1 | 9/2006 | Ofek et al. |
| 7,111,021 B1* | 9/2006 | Lewis et al. .................. 707/649 |
| 7,111,189 B1 | 9/2006 | Sicola et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,158,985 B1 | 1/2007 | Liskov |
| 7,177,866 B2 | 2/2007 | Holenstein et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,194,487 B1 | 3/2007 | Kekre et al. |
| 7,200,620 B2 | 4/2007 | Gupta |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,391 B2 | 6/2007 | Aronoff et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Armangau et al. |
| 7,278,142 B2 | 10/2007 | Bandhole et al. |
| 7,284,153 B2 | 10/2007 | Okbay et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,318,134 B1 | 1/2008 | Oliveira et al. |
| 7,340,652 B2 | 3/2008 | Jarvis et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,363,444 B2 | 4/2008 | Ji |
| 7,370,232 B2 | 5/2008 | Safford |
| 7,373,364 B1 | 5/2008 | Chapman |
| 7,380,072 B2 | 5/2008 | Kottomtharayil et al. |
| 7,383,293 B2 | 6/2008 | Gupta et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |

(56) References Cited

U.S. PATENT DOCUMENTS

| | | |
|---|---|---|
| 7,401,064 B1 | 7/2008 | Arone et al. |
| 7,409,509 B2 | 8/2008 | Devassy et al. |
| 7,415,488 B1 | 8/2008 | Muth et al. |
| 7,428,657 B2 | 9/2008 | Yamasaki |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,457,980 B2 | 11/2008 | Yang et al. |
| 7,461,230 B1 | 12/2008 | Gupta et al. |
| 7,464,236 B2 | 12/2008 | Sano et al. |
| 7,467,167 B2 | 12/2008 | Patterson |
| 7,467,267 B1 | 12/2008 | Mayock |
| 7,469,262 B2 | 12/2008 | Baskaran et al. |
| 7,472,238 B1 | 12/2008 | Gokhale |
| 7,472,312 B2 | 12/2008 | Jarvis et al. |
| 7,475,284 B2 | 1/2009 | Koike |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,502,902 B2 | 3/2009 | Sato |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyil et al. |
| 7,523,483 B2 | 4/2009 | Dogan |
| 7,529,745 B2 | 5/2009 | Ahluwalia et al. |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,533,181 B2 | 5/2009 | Dawson et al. |
| 7,536,291 B1 | 5/2009 | Retnamma et al. |
| 7,539,707 B2 | 5/2009 | Prahlad et al. |
| 7,539,835 B2 | 5/2009 | Kaiser |
| 7,543,125 B2 | 6/2009 | Gokhale |
| 7,546,324 B2 | 6/2009 | Prahlad et al. |
| 7,546,364 B2 | 6/2009 | Raman et al. |
| 7,565,572 B2 | 7/2009 | Yamasaki |
| 7,581,077 B2 | 8/2009 | Ignatius et al. |
| 7,593,966 B2 | 9/2009 | Therrien et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,321 B2 | 11/2009 | Clark |
| 7,617,369 B1 | 11/2009 | Bezbaruah et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,669,029 B1 | 2/2010 | Mishra et al. |
| 7,673,000 B2 | 3/2010 | Smoot et al. |
| 7,685,126 B2 | 3/2010 | Patel et al. |
| 7,689,467 B1 | 3/2010 | Belanger et al. |
| 7,694,086 B1 | 4/2010 | Bezbaruah et al. |
| 7,702,533 B2 | 4/2010 | Barnard et al. |
| 7,702,670 B1 * | 4/2010 | Duprey et al. ............... 707/646 |
| 7,707,184 B1 * | 4/2010 | Zhang et al. ............... 707/645 |
| 7,716,171 B2 | 5/2010 | Kryger |
| 7,734,715 B2 | 6/2010 | Hyakutake et al. |
| 7,739,235 B2 | 6/2010 | Rousseau et al. |
| 7,809,691 B1 | 10/2010 | Karmarkar et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,870,355 B2 | 1/2011 | Erofeev |
| 7,904,681 B1 | 3/2011 | Bappe |
| 7,930,476 B1 | 4/2011 | Castelli et al. |
| 7,962,455 B2 | 6/2011 | Erofeev |
| 7,962,709 B2 | 6/2011 | Agrawal |
| 8,005,795 B2 * | 8/2011 | Galipeau et al. ............... 707/648 |
| 8,024,294 B2 | 9/2011 | Kottomtharayil |
| 8,121,983 B2 | 2/2012 | Prahlad et al. |
| 8,166,263 B2 | 4/2012 | Prahlad |
| 8,190,565 B2 | 5/2012 | Prahlad et al. |
| 8,195,623 B2 | 6/2012 | Prahlad et al. |
| 8,204,859 B2 | 6/2012 | Ngo |
| 8,219,524 B2 | 7/2012 | Gokhale |
| 8,271,830 B2 | 9/2012 | Erofeev |
| 8,285,684 B2 | 10/2012 | Prahlad et al. |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,504,515 B2 | 8/2013 | Prahlad et al. |
| 8,504,517 B2 | 8/2013 | Agrawal |
| 8,572,038 B2 | 10/2013 | Erofeev |
| 8,589,347 B2 | 11/2013 | Erofeev |
| 8,655,850 B2 | 2/2014 | Ngo et al. |
| 8,656,218 B2 | 2/2014 | Erofeev |
| 8,666,942 B2 | 3/2014 | Ngo |
| 8,725,694 B2 | 5/2014 | Kottomtharayil |
| 8,725,698 B2 | 5/2014 | Prahlad et al. |
| 8,726,242 B2 | 5/2014 | Ngo |
| 8,745,105 B2 | 6/2014 | Erofeev |
| 8,793,221 B2 | 7/2014 | Prahlad et al. |
| 8,868,494 B2 | 10/2014 | Agrawal |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0035866 A1 | 11/2001 | Finger et al. |
| 2001/0042222 A1 | 11/2001 | Kedem et al. |
| 2001/0044807 A1 | 11/2001 | Kleiman et al. |
| 2002/0002557 A1 | 1/2002 | Straube et al. |
| 2002/0004883 A1 | 1/2002 | Nguyen et al. |
| 2002/0019909 A1 | 2/2002 | D'Errico |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0062230 A1 | 5/2002 | Morag et al. |
| 2002/0069324 A1 | 6/2002 | Gerasimov et al. |
| 2002/0083055 A1 | 6/2002 | Pachet et al. |
| 2002/0091712 A1 | 7/2002 | Martin et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0120741 A1 | 8/2002 | Webb et al. |
| 2002/0124137 A1 | 9/2002 | Ulrich et al. |
| 2002/0133511 A1 | 9/2002 | Hostetter et al. |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174139 A1 | 11/2002 | Midgley et al. |
| 2002/0174416 A1 | 11/2002 | Bates et al. |
| 2002/0181395 A1 | 12/2002 | Foster et al. |
| 2003/0005119 A1 | 1/2003 | Mercier et al. |
| 2003/0018657 A1 | 1/2003 | Monday |
| 2003/0023893 A1 | 1/2003 | Lee et al. |
| 2003/0028736 A1 | 2/2003 | Berkowitz et al. |
| 2003/0033308 A1 | 2/2003 | Patel et al. |
| 2003/0061491 A1 | 3/2003 | Jaskiewicz et al. |
| 2003/0079018 A1 | 4/2003 | Lolayekar et al. |
| 2003/0097296 A1 | 5/2003 | Putt |
| 2003/0126200 A1 | 7/2003 | Wolff |
| 2003/0131278 A1 | 7/2003 | Fujibayashi |
| 2003/0135783 A1 | 7/2003 | Martin et al. |
| 2003/0161338 A1 | 8/2003 | Ng et al. |
| 2003/0167380 A1 | 9/2003 | Green et al. |
| 2003/0177149 A1 | 9/2003 | Coombs |

(56) References Cited

U.S. PATENT DOCUMENTS

| | | |
|---|---|---|
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0006572 A1 | 1/2004 | Hoshino et al. |
| 2004/0006578 A1 | 1/2004 | Yu |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0078632 A1 | 4/2004 | Infante et al. |
| 2004/0098425 A1 | 5/2004 | Wiss et al. |
| 2004/0107199 A1 | 6/2004 | Dalrymple et al. |
| 2004/0117438 A1 | 6/2004 | Considine et al. |
| 2004/0117572 A1 | 6/2004 | Welsh et al. |
| 2004/0133634 A1 | 7/2004 | Luke et al. |
| 2004/0139128 A1 | 7/2004 | Becker et al. |
| 2004/0158588 A1 | 8/2004 | Pruet |
| 2004/0193625 A1 | 9/2004 | Sutoh |
| 2004/0193953 A1 | 9/2004 | Callahan et al. |
| 2004/0205206 A1 | 10/2004 | Naik et al. |
| 2004/0212639 A1 | 10/2004 | Smoot et al. |
| 2004/0215724 A1 | 10/2004 | Smoot et al. |
| 2004/0225437 A1 | 11/2004 | Endo et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267777 A1 | 12/2004 | Sugimura et al. |
| 2004/0267835 A1 | 12/2004 | Zwilling et al. |
| 2004/0267836 A1 | 12/2004 | Armangau et al. |
| 2005/0015409 A1 | 1/2005 | Cheng et al. |
| 2005/0027892 A1 | 2/2005 | McCabe et al. |
| 2005/0033800 A1 | 2/2005 | Kavuri et al. |
| 2005/0044114 A1 | 2/2005 | Kottomtharayil et al. |
| 2005/0055445 A1 | 3/2005 | Gupta et al. |
| 2005/0060613 A1 | 3/2005 | Cheng |
| 2005/0071389 A1 | 3/2005 | Gupta et al. |
| 2005/0071391 A1 | 3/2005 | Fuerderer et al. |
| 2005/0080928 A1 | 4/2005 | Beverly et al. |
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0131900 A1 | 6/2005 | Palliyll et al. |
| 2005/0138306 A1 | 6/2005 | Panchbudhe et al. |
| 2005/0144202 A1 | 6/2005 | Chen |
| 2005/0172073 A1 | 8/2005 | Voigt |
| 2005/0187982 A1 | 8/2005 | Sato |
| 2005/0187992 A1 | 8/2005 | Prahlad et al. |
| 2005/0188109 A1 | 8/2005 | Shiga et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0228875 A1 | 10/2005 | Monitzer et al. |
| 2005/0246376 A1 | 11/2005 | Lu et al. |
| 2005/0246510 A1 | 11/2005 | Retnamma et al. |
| 2005/0254456 A1 | 11/2005 | Sakai |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0010341 A1 | 1/2006 | Kodama |
| 2006/0020616 A1 | 1/2006 | Hardy et al. |
| 2006/0034454 A1 | 2/2006 | Damgaard et al. |
| 2006/0036901 A1 | 2/2006 | Yang et al. |
| 2006/0047805 A1 | 3/2006 | Byrd et al. |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0155946 A1 | 7/2006 | Ji |
| 2006/0171315 A1 | 8/2006 | Choi et al. |
| 2006/0174075 A1 | 8/2006 | Sutoh |
| 2006/0215564 A1 | 9/2006 | Breitgand et al. |
| 2006/0230244 A1 | 10/2006 | Amarendran et al. |
| 2006/0242371 A1 | 10/2006 | Shono et al. |
| 2006/0242489 A1 | 10/2006 | Brockway et al. |
| 2007/0033437 A1 | 2/2007 | Kawamura et al. |
| 2007/0043956 A1 | 2/2007 | El Far et al. |
| 2007/0050547 A1 | 3/2007 | Sano |
| 2007/0055737 A1 | 3/2007 | Yamashita et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0130373 A1 | 6/2007 | Kalwitz |
| 2007/0143371 A1 | 6/2007 | Kottomtharayil |
| 2007/0143756 A1 | 6/2007 | Gokhale |
| 2007/0179990 A1 | 8/2007 | Zimran et al. |
| 2007/0183224 A1 | 8/2007 | Erofeev |
| 2007/0185852 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahland et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0226438 A1 | 9/2007 | Erofeev |
| 2007/0244571 A1 | 10/2007 | Wilson et al. |
| 2007/0260609 A1 | 11/2007 | Tulyani |
| 2007/0276848 A1 | 11/2007 | Kim |
| 2007/0288536 A1 | 12/2007 | Sen et al. |
| 2008/0016126 A1 | 1/2008 | Kottomtharayil et al. |
| 2008/0016293 A1 | 1/2008 | Saika |
| 2008/0059515 A1 | 3/2008 | Fulton |
| 2008/0077634 A1 | 3/2008 | Quakenbush |
| 2008/0103916 A1 | 5/2008 | Camarador et al. |
| 2008/0104357 A1 | 5/2008 | Kim et al. |
| 2008/0114815 A1 | 5/2008 | Sutoh |
| 2008/0147878 A1 | 6/2008 | Kottomtharayil et al. |
| 2008/0183775 A1 | 7/2008 | Prahlad et al. |
| 2008/0205301 A1 | 8/2008 | Burton et al. |
| 2008/0208933 A1 | 8/2008 | Lyon |
| 2008/0228987 A1 | 9/2008 | Yagi |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244205 A1 | 10/2008 | Amano et al. |
| 2008/0250178 A1 | 10/2008 | Haustein et al. |
| 2008/0306954 A1 | 12/2008 | Hornqvist |
| 2008/0313497 A1 | 12/2008 | Hirakawa |
| 2009/0013014 A1 | 1/2009 | Kern |
| 2009/0044046 A1 | 2/2009 | Yamasaki |
| 2009/0113056 A1 | 4/2009 | Tameshige et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0300079 A1 | 12/2009 | Shitomi |
| 2009/0319534 A1 | 12/2009 | Gokhale |
| 2009/0319585 A1 | 12/2009 | Gokhale |
| 2010/0005259 A1 | 1/2010 | Prahlad |
| 2010/0049753 A1 | 2/2010 | Prahlad et al. |
| 2010/0094808 A1 | 4/2010 | Erofeev |
| 2010/0100529 A1 | 4/2010 | Erofeev |
| 2010/0131461 A1 | 5/2010 | Prahlad et al. |
| 2010/0131467 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2012/0011336 A1 | 1/2012 | Saika |
| 2013/0006938 A1 | 1/2013 | Prahlad et al. |
| 2013/0006942 A1 | 1/2013 | Prahlad et al. |
| 2014/0067764 A1 | 3/2014 | Prahlad et al. |
| 2014/0074777 A1 | 3/2014 | Agrawal |
| 2014/0164327 A1 | 6/2014 | Ngo et al. |
| 2014/0181022 A1 | 6/2014 | Ngo |

(56) References Cited

U.S. PATENT DOCUMENTS

| | | | |
|---|---|---|---|
| 2014/0181029 | A1 | 6/2014 | Erofeev |
| 2014/0236900 | A1 | 8/2014 | Kottomtharayil |
| 2014/0324772 | A1 | 10/2014 | Prahlad et al. |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 200347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2010/068570 | 6/2010 |

OTHER PUBLICATIONS

Armstead et al., "Implementation of a Campus-Wide Distributed Mass Storage Service: The Dream vs. Reality," IEEE, 1995, pp. 190-199.
Arneson, "Development of Omniserver; Mass Storage Systems," Control Data Corporation, 1990, pp. 88-93.
Arneson, "Mass Storage Archiving in Network Environments" IEEE, 1998, pp. 45-50.
Ashton, et al., "Two Decades of policy-based storage management for the IBM mainframe computer", www.research.ibm.com, 19 pages, published Apr. 10, 2003, printed Jan. 3, 2009, www.research.ibm.com, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.
Calvert, Andrew, "SQL Server 2005 Snapshots", published Apr. 3, 2006, http:/www.simple-talk.com/contnet/print.aspx?article=137, 6 pages.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Gray, et al. "Transaction processing: concepts and techniques" 1994, Morgan Kaufmann Publishers, USA, pp. 604-609, 646-655.B7.
Harrington, "The RFP Process: How to Hire a Third Party", Transportation & Distribution, Sep. 1988, vol. 39, Issue 9, in 5 pages.
http://en.wikipedia.org/wiki/Naive_Bayes_classifier, printed on Jun. 1, 2010, in 7 pages.
IBM, "Intelligent Selection of Logs Required During Recovery Processing", ip.com, Sep. 16, 2002, 4 pages.
IBM, "Near Zero Impact Backup and Data Replication Appliance", ip.com, Oct. 18, 2004, 5 pages.
Jander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Mangement approach using LSI and Domain specific Ontologies", FLAIRS-01 Proceedings, 2001, pp. 300-302.
Lyon J., Design considerations in replicated database systems for disaster protection, COMPCON 1988, Feb. 29, 1988, pp. 428-430.
Microsoft Corporation, "Microsoft Exchange Server: Best Practices for Exchange Database Management," 1998.
Park, et al., "An Efficient Logging Scheme for Recoverable Distributed Shared Memory Systems", IEEE, 1997, 9 pages.
Rosenblum et al., "The Design and Implementation of a Log-Structure File System," Operating Systems Review SIGOPS, vol. 25, No. 5, New York, US, pp. 1-15 (May 1991).
The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.
Veritas Software Corporation, "Veritas Volume Manager 3.2, Administrator's Guide," Aug. 2001, 360 pages.
Wiesmann, Database replication techniques: a three parameter classification, Oct. 16, 2000, pp. 206-215.
Final Office Action for Japanese Application No. 2003531581, Examiner Kudoh, Mail Date Mar. 24, 2009, 6 pages.
International Search Report and Written Opinion dated Nov. 13, 2009, PCT/US2007/081681.
First Office Action for Japanese Application No. 2003531581, mail date Jul. 8, 2008, Examiner Kudoh, 8 pages.
International Preliminary Report on Patentability, PCT Application No. PCT/US2009/066880, mailed Jun. 23, 2011, in 9 pages.
International Search Report and Written Opinion issued in PCT Application No.: PCT/US2011/030396, mailed Jul. 18, 2011, in 20 pages.
International Search Report and Written Opinion issued in PCT Application No.: PCT/US2011/38436, mailed Sep. 21, 2011, in 18 pages.
Canadian Office Action dated Sep. 24, 2012, Application No. 2,632,935, 2 pages.
European Examination Report; Application No. 06848901.2, Apr. 1, 2009, pp. 7.
Examiner's First Report; Application No. 2006331932, May 11, 2011 in 2 pages.
Canadian Office Action dated Dec. 29, 2010, Application No. CA2546304.
Examiner's Report for Australian Application No. 2003279847, dated Dec. 9, 2008, 4 pages.
First Office Action in Canadian application No. 2,632,935 dated Feb. 16, 2012, in 5 pages.
International Search Report dated May 15, 2007, PCT/US2006/048273.
Second Examination Report in EU Appl. No. 06 848 901.2-2201 dated Dec. 3, 2010.
International Search Report and Written Opinion dated Mar. 25, 2010, PCT/US2009/066880.
International Preliminary Report on Patentability and Written Opinion in PCT/US2011/030396 mailed Oct. 2, 2012.
International Preliminary Report on Patentability and Written Opinion in PCT/US2011/038436 mailed Dec. 4, 2012.
International Search Report dated Dec. 28, 2009, PCT/US204/038324.
International Search Report and Written Opinion dated Jan. 11, 2006, PCT/US2004/038455.
Exam Report in Australian Application No. 2009324800 dated Jun. 17, 2013.

* cited by examiner

SYSTEMS AND METHODS FOR CONTINUOUS DATA REPLICATION

INCORPORATION BY REFERENCE TO ANY PRIORITY APPLICATIONS

Any and all applications for which a foreign or domestic priority claim is identified in the Application Data Sheet, or any correction thereto, are hereby incorporated by reference under 37 CFR 1.57.

BACKGROUND OF THE INVENTION

Field of the Invention

The inventions disclosed herein generally relate to performing copy operations in a computer system. More particularly, aspects of the present inventions relate to systems and methods associated with continuous data replication in computing systems.

Storage management systems have evolved over time into complex entities with many components including hardware and software modules designed to perform a variety of different storage operations on electronic data. Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), as an archive copy, and as other types of copies.

A primary copy of data is generally a production copy or other "live" version of the data which is used by a software application and is typically in the native format of that application. Primary copy data may be maintained in a local memory or other high-speed storage device that allows for relatively fast data access. Such primary copy data is typically retained for a period of time (e.g., a number of seconds, minutes, hours or days) before some or all of the data is stored as one or more secondary copies, for example, to prevent loss of data in the event a problem occurs with the data stored in primary storage.

Secondary copies may include point-in-time data and may be intended for long-term retention (e.g., weeks, months or years depending on retention criteria, for example as specified in a storage policy as further described herein) before some or all of the data is moved to other storage or discarded. Secondary copies may be indexed so users can browse and restore the data at another point in time. After certain primary copy data is copied to secondary storage, a pointer or other location indicia such as a stub may be placed in the primary copy to indicate the current location of that data.

One type of secondary copy is a backup copy. A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at an offsite location.

Another form of secondary copy is a snapshot copy. From an end-user viewpoint, a snapshot may be thought of as a representation or image of the primary copy data at a given point in time. A snapshot generally creates a bit map or block level representation of a primary copy volume at a particular moment in time. Users typically gain a read-only access to the record of files and directories of the snapshot. By electing to restore primary copy data from a snapshot taken at a given point in time, users may also return the current file system to the prior state of the file system that existed when the snapshot was taken.

A snapshot may be created instantly, using a minimum of file space, but may still function as a conventional file system backup. A snapshot may not actually create another physical copy of all the data, but may simply create pointers that are mapped to specific blocks of data taken at the point in time of the snapshot.

In some conventional systems, once a snapshot has been taken, the original blocks in use at the time at snapshot are preserved in a cache such that only subsequent changes to the file system would overwrite them. Therefore, the initial snapshot may use only a small amount of disk space needed to record a mapping or other data structure representing or otherwise tracking the blocks that correspond to the current state of the volume (e.g., a bit map). Additional disk space is usually only required when files are actually modified later.

For example, in the case of copy-on-write snapshots, when a block changes in primary storage, the block is copied to another location in primary storage before the block is overwritten and the snapshot map is updated to reflect the changed block(s) at that particular point in time.

However, such copy-on-write systems merely copy blocks of data based on certain replication criteria such as hardware capacity or predefined replication thresholds, or times that are substantially unrelated to the operation of the application(s) whose data is being captured.

For example, a snapshot may be taken according to the above-mentioned criteria at a point in time during which certain application data operations have failed to fully complete (e.g., a multi-part write operation that has begun but not yet completed or been committed to memory, etc.). In this case, the captured data may not represent a valid state of operation or may represent an incomplete picture of system operation as only existing data and not information representing executing operations are captured. Thus, if such data is used in a restore operation, the result may be an unstable or corrupt application.

Accordingly, in view of the foregoing, it may be desirable to provide systems and methods for improved capture and replication of application data in storage management systems.

SUMMARY OF THE INVENTION

In accordance with certain aspects of the present invention, systems and methods associated with intelligent data replication are provided, which may include the identification and use of consistency points in application data, such that one or more replication volumes may be created using an "application aware" replication process that allows the system to intelligently replicate data or other information (e.g., metadata) relating to a particular process, application or specified set of data.

In some embodiments, this may include identifying the files and/or data associated with a particular application necessary to recreate, recover or restore the application to a known "good," "recoverable" or "operative" state as indicated by one or more consistency points. This minimizes or avoids problems associated with capturing data representing an application in a transitory or unstable state as mentioned above. The use of consistency points may involve evaluating an application to determine appropriate points within certain application data that represents a recoverable state, such that data replicated up to the consistency point represents all or substantially all of the information necessary to reliably restore the application or volume as of a certain point in time.

In some embodiments, consistency points may be generated periodically in conjunction with the application being replicated. For example, certain components of the present invention may periodically quiesce an application (e.g., temporally pause at a certain point in time) and insert a marker, tag or indicator in a log file, cache, or data structure associated with a volume as data passes through an I/O stack which is based, at least in part, on the data transactions allowed as of the point in time at which the application quiesced (referred to herein as a consistency point). In other embodiments, however, consistency points may be generated by the application itself with the replication system monitoring the application and noting such points for use in replication management as further described herein. It will be appreciated that in some embodiments, an application may merely pause operation at certain known good points and communicate this to the replication system, which may insert an appropriate indicator denoting the consistency point.

Accordingly, aspects of the present invention may identify points within application data that represent a known consistent state, and using this information, provide the system with the means and opportunity to intelligently replicate sections of application data that represent a recoverable state.

A further benefit of aspects of the present invention is the generation of known good replication copies that may be accessed and used as direct copies of production volume data. This feature allows a user, management component, or other person or process in a computing system to directly access, restore, backup, or otherwise manipulate replication copies of production data as if they were copies of production data itself and not copies of replication data, thereby improving system performance characteristics such as access time, reducing memory requirements, and minimizing impact on client applications among other benefits as further described herein.

Thus, in accordance with certain aspects of the present invention, methods and apparatus for copying application data indicative of a known recoverable state of an operating software application are provided. This may include identifying a set of data indicative of the known recoverable state of the software application from a group of software application data that represents the operating software application. Generating an indicator and placing the indicator at a point in the group of software application data that represents the set of data indicative of the known recoverable state. Copying the set of data indicative of the known recoverable state designated by the indicator such that the copied set of data may be used to restore the operating software application to a known stable state.

In accordance with certain other aspects of the invention, methods and apparatus for correlating copies of application data of an operating software application in a storage system are provided. This may involve identifying a set of data indicative of the operating software application, creating a first data log and copying the software application data that represents the operating software application to the first data log and generating an indicator and placing the indicator at a point in the software application data.

A time stamp may be assigned to the indicator, and periodically copy the data stored in the first data log to a second data log, copying data from the second data log to one or more first storage devices until the indicator is reached, associating a second time stamp with the copying of data to the to the one or more first storage devices; and associating the first time stamp to the second time stamp such that the application data stored in the first data log is correlated with the application data stored on the one or more first storage devices.

BRIEF DESCRIPTION OF THE DRAWINGS

Aspects of the invention are illustrated in the figures of the accompanying drawings which are meant to be exemplary and not limiting, in which like references refer to like or corresponding parts, and in which.

DETAILED DESCRIPTION OF THE PREFERRED EMBODIMENT

Figure 1A:
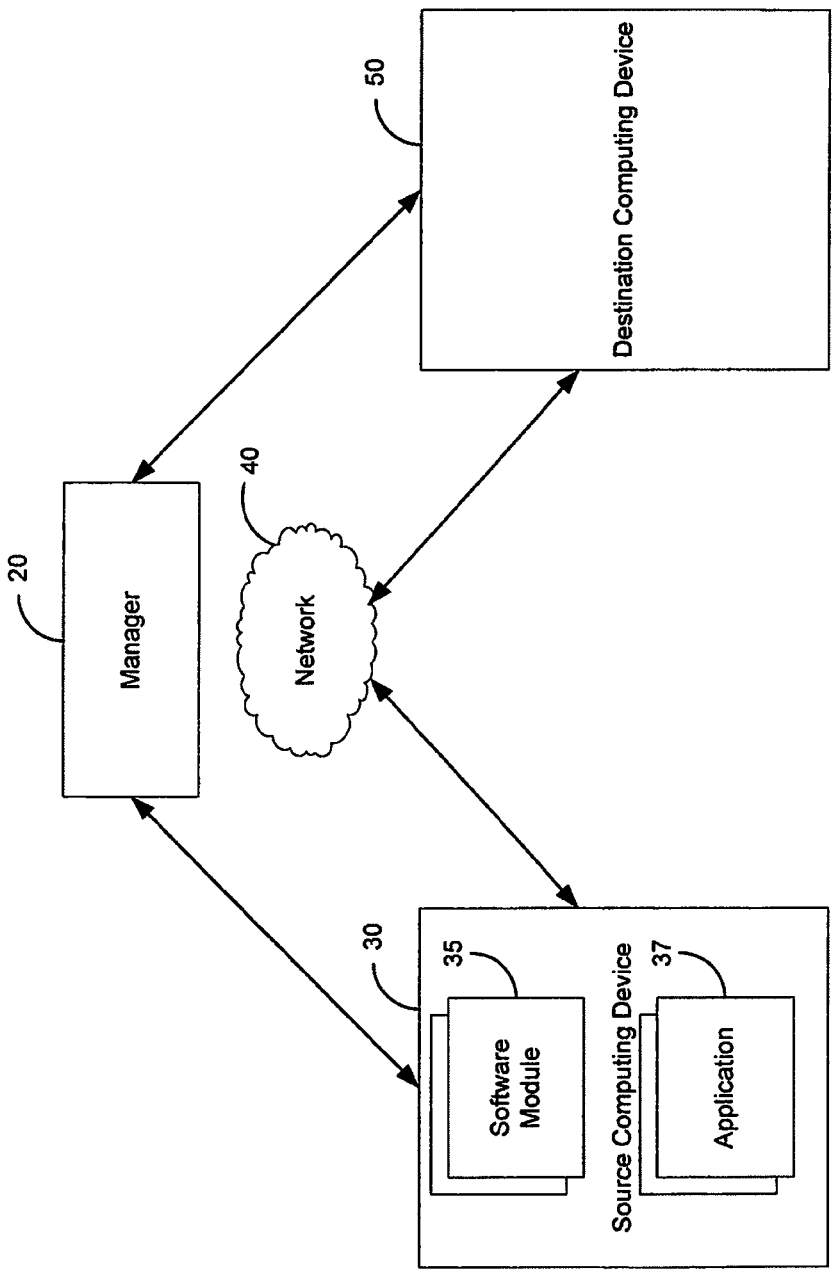
FIG. 1A is a general block diagram illustrating a replication system in accordance with one embodiment of the invention.

According to one or more embodiments of the present invention, systems and methods are provided for intelligent data replication, which may include the use of consistency points in various data logs, such that one or more copies may be created by providing an "application aware" replication process that allows the system to intelligently identify and replicate certain information relating to a particular process or application. This may include identifying the folders, directories, files and/or other data associated with a particular application or process which may be used to recreate, recover or restore the application to a known "good" or "recoverable" state as is known in the art.

For example, an application or process may be quiesced or suspended by allowing currently executing data operations to fully complete (and not allow others to begin, or, are buffered for subsequent execution) such that substantially no operations are in progress and the data involved in the operations are consistent and stored in non-volatile memory. When this occurs, the data representing the application or process may be considered to be in a known good or recoverable state, from which the application or process may be reliably restored.

On the other hand, if an application or process is in between such states, such as when data operations are in progress and not fully complete (i.e., continue to execute and are not buffered), data representing the application or process at this point in time generally does not accurately reflect the state of the process or application. Thus, the application or process may not be reliably restored from the available data. This may be referred to as data representing an application in a potentially unstable or corrupted state.

The generation and use of consistency points in accordance with aspects of the present invention may be used to substantially prevent the replication of data representing an unstable state. For example, the generation of the aforementioned consistency points may involve the initial evaluation a subject application or process and determining appropriate points within application data that represent a recoverable state, such that data replicated as of the consistency point represents all or substantially all of the information necessary to reliably restore the application as of a certain point in time. This may be accomplished by installing certain software modules, such as data agents, which may analyze the application and/or process operation and determine what information is required for successful and reliable restoration.

The use of consistency points allows embodiments of the present invention to recognize certain points within application data that represent a recoverable state, and thus provide the system with the means and opportunity to intelligently replicate sections of data that represent a stable recoverable state rather than, for example, merely copying certain blocks of data based on hardware capacity or predefined replication thresholds which are unrelated to application recoverability and may represent intermediate or unstable states of operation.

A general block diagram of a system 10 constructed in accordance with certain aspects of the present invention is shown in FIG. 1A. As shown, system 10 may include a source computing device 30 one or more software modules 35, one or more applications 37, a destination computing device 50, a network 40 and an optional manager component 20.

In operation, a software module 35 such as a data agent may be installed on source computing device 30. The software module may analyze the various software applications or processes operating on device 30 and identify the information necessary to restore one or more such applications or processes (such as application 37) at a given point in time. This information may be periodically copied from source device 30 to destination device 50 based on consistency points such that copies of data, representative of a known good state, are present on destination computing device 50 (for example, as a protective measure against any data corruption that may occur on source 30).

For example, upon installation, software module 35 may identify certain information necessary to restore application 37 to its present state and copy that information over to destination device 50 as part of an initial seeding process (e.g., which may involve copying some or all source data at start up). Module 35 may continue to monitor the operation of the application 37 and interact with it to periodically copy data representative of a known good state to destination 50.

This may involve quiescing application 37 such that it reaches a stable state (e.g., by fully completing all pending data manipulation operations). When application 37 reaches a stable state, a consistency point may be placed in a data log by software module 35 or application 37 indicating a point in the log entries representing a known good state. Information from the log up to this consistency point may be transferred to destination device 50 via network 40, which may be used to restore application 37, if necessary. Moreover, device 50 may periodically copy portions of this information to other various internal or external data stores as replication copies (not shown).

In certain embodiments, these replication copies may be accessed directly by source device 30 in the event it is desired to restore one or more applications 37 to a previous state (bypassing copies in destination device 50). One way this may be done is by pointing destination device 50, module 35, or management module 20 directly to the replication copies for restore operations rather than to the destination device or other storage. Optional management component 20 may coordinate the copy operations between source 30 and destination 50. In some embodiments, source device 30 and destination device 50 may be the same computing device (e.g., the same personal computer).

Figure 1B:
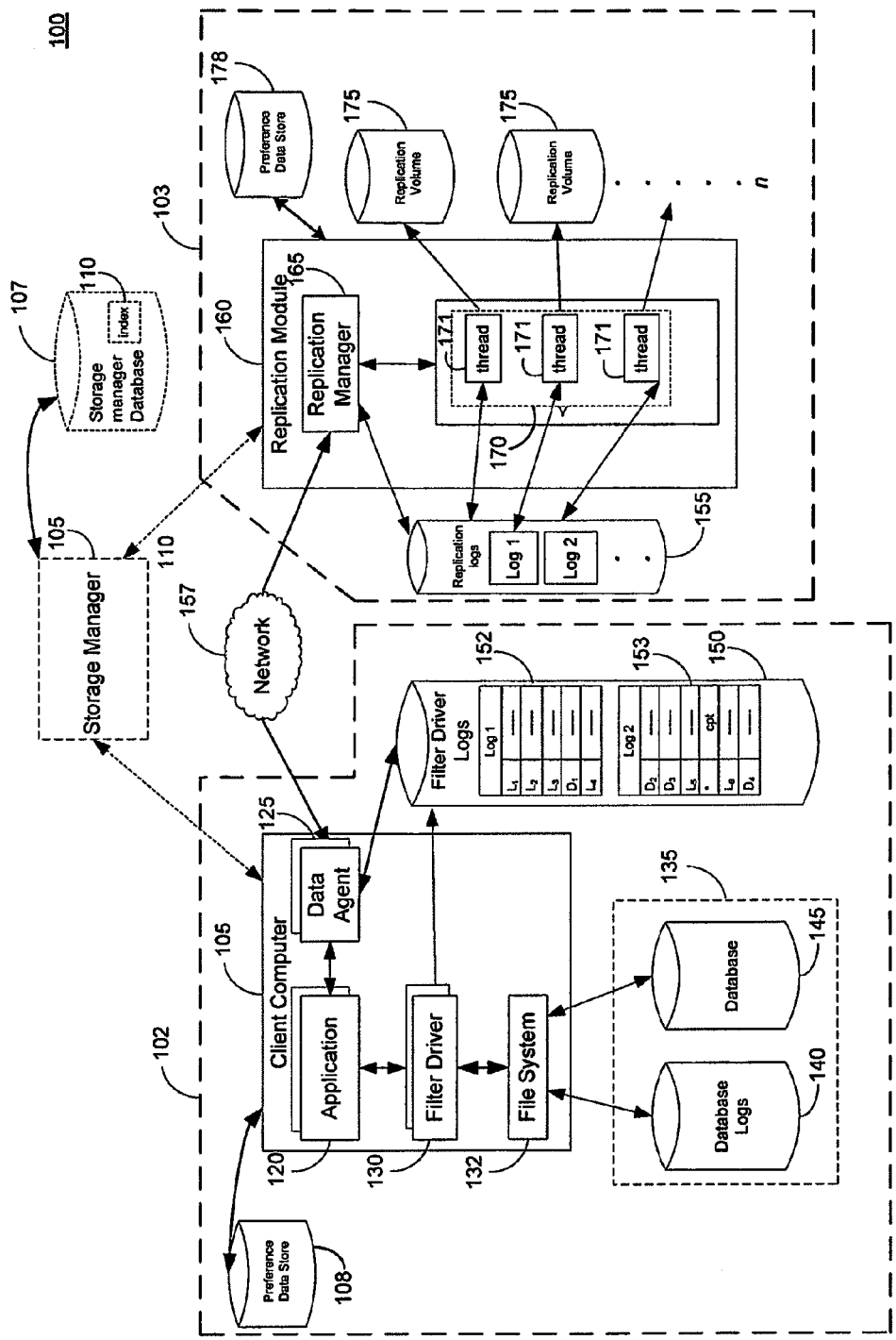
FIG. 1B is a more detailed block diagram illustrating a replication system of FIG. 1A in accordance with one embodiment of the invention.

A more detailed illustration of system 10 is shown in FIG. 1B as system 100, which is constructed in accordance with certain aspects of the present invention. As in FIG. 1A, system 100 may be represented as source node or computing device 102 and destination node or computing device 103 as indicated by the dashed lines (referred to as computing device 102 and 103 hereafter for convenience). Computing device 102 may include client computer 105 with an associated data store 108. Client computer 105 may include one or more software applications 120, one or more data agents 125, one or more filter drivers 130, one or more file systems 132, an internal or external data store 135 which may include a database log 140 and a database 145 and other storage devices. Computing device 102 also preferably includes a filter driver log 150 which stores data referred to it by filter driver(s) 130.

Computing device 103 may include replication logs 155 and replication module 160 which may have an associated data store 178. As shown, replication module 160 may include replication manager 165, a copy module 170 (which may include one or more replication threads 170) that periodically copies information from replication logs 155 to one or more storage devices 175 or other memory locations (labeled as replication volumes). In some embodiments, system 100 may further include certain optional components such as storage manager 106, storage manager database 107 which may include a storage manager index or other data structure 110 containing system management and preference information (depicted with dashed lines).

According to various embodiments, the system of FIG. 1B may operate as follows. An application 120 executing on client computer 105 such as MICROSOFT EXCHANGE, MICROSOFT SHARE POINT, MICROSOFT SQL, MICROSOFT WORD, or other suitable computer application such as any financial, management, e-commerce, browsing, database or other application, etc. that writes data to and from memory, such as primary storage or production level memory (e.g., data store 135) during normal operation. In some embodiments, information written to data store 135 (or other data stores not having a database component (not shown)) may be managed and coordinated by file system 132 which may be any conventional file system for coordinating data transfer such as a file server or other appropriate conventional management program or hardware as is known in the art.

Moreover, it will be appreciated that during operation, information or other application data referred to data store 135 may be first written to log file 140 and subsequently committed to database 145 in accordance with conventional data management techniques. For example, data destined for database 140 may be queued in log 140 for a certain period of time and then entered into database 145 in the appropriate order and location. In addition, although only one log file and database are shown, it will be understood that additional log files and databases may be added to meet the storage needs of one or more applications 120 executing on client computer 105.

Prior to reaching log file 140, application data associated with a write operation may be monitored and/or filtered by filter driver 130 (e.g., parsed, processed and copied for log entry), which may have been installed by data agent 125 during initialization period (discussed in more detail in connection with FIG. 2). The filter driver may be installed according to predefined criteria that causes certain application data to be written to filter driver log 150 for subsequent copying to replication log 155.

Filter driver 130 may be any suitable process or program code known in the art such as a data trapping or snooping program, block or data filter or other program code that when executed may operate and/or be resident in the section of memory governing input/output operations of the application and/or file system (the "I/O stack"). The filter driver may monitor data operations in the I/O stack and intercept, process, parse, analyze and copy certain application data to filter driver log 155 as the data travels from application 120 to data store 135. Typically, this includes application data relating to changes, updates and new information associated with the application of interest (e.g., application 120).

In some embodiments, filter driver 130 may detect and analyze a data operation in progress (e.g., a write operation), determine whether the type of operation should be replicated, for example, as specified according to a policy, selection criteria or other preference (e.g., through comparison techniques), perform any necessary offset or location calculation to locate application data which may, in some instances, be found in the "payload section." For example, this may include determining where data is located in the original file and creating a log entry with data written and/or parsed in the payload and copy that log entry to log 150 and permit the operation to continue on to file system 132 and data store 135. Filter driver 130 may further analyze data in transit and copy, generate or examine other relevant information, such as metadata, log entry number, time stamp, application type, data size and start field, etc. that may be useful in the replication process.

In some embodiments, multiple filter drivers, each dedicated to a particular application, may be deployed on a single client 105. In other embodiments, a single filter driver 130 may be suitable for use with multiple application types or may be adaptable or configurable for use with one or multiple applications (for example, by instantiating one or more instances of customized or particularized filtering programs based on application specifics, or other needs or preferences.)

Filter driver 130 is typically deployed on the client prior to the beginning of the replication process (e.g., by data agent 125). For example, in some embodiments a manager 105 or other component may install data agent 125, which may, in turn, analyze and identify certain applications and/or processes. Based on this, data agent 125 may install one or more specific or generic filter drivers 130 to monitor the identified applications and create and populate filter driver logs 150 as further described herein.

During operation, filter driver 130 may substantially continuously process and refer data relating to one or more applications to filter driver log 150 as further described herein. For example, as shown in FIG. 1B, data relating to each application of interest may be written to a particular log file established for that application. For example, as shown, log file 152 (Log 1) within filter driver log 150 may relate to a first application of interest, whereas log file 153 (Log 2) may relate to a second application of interest, etc.

In alternate embodiments, however, one or more log files may be shared by multiple applications (not shown). For example, a single log may contain entries relating to one or more applications. Such log entries may be arbitrarily written to the log or may be entered (or grouped) based on time, data type, application type or other parameters. Moreover, in other embodiments, log files may be arranged based on size (e.g., each log file 512K) and shared with multiple applications, which perform copy operations as the log files reach a certain percentage of capacity or after a specified time (e.g., every 5 seconds, every 5 hours, etc.)

The log files may be created by data agent 125 or filter driver(s) 130 as part of the initial deployment or initialization and may be continuously produced and updated as part of an ongoing process. Moreover, as shown, data may be written to the log files in a manner similar to or the same as data sent to data store 135.

In some embodiments, the log entries may include certain indicators that reflect information regarding the data including certain source system information such as memory position, relative order in group of operations, etc. For example, the log entries may include information regarding actual or relative position source system memory, which may indicate the logical or physical location (e.g., database log 140, or database 145, etc.), the relative position of the data with respect to other entries (i.e., the correct order of the data, how it should be read, etc.). For example, this may include the temporal order in which data was written to memory. Moreover, this may further include the use of sequential entry identifiers such as L1 (entry intended for database log 140 and is number 1 in order of operations with respect to other entries) or D3 (a database commit entry intended for database 145 and is number 3 in order of operations) etc. Such identifiers, may, in addition to indicating destination further include certain metadata describing the data such as time stamp, length, whether the entry is part of a linked list, the next and/or previous entry in that list etc.

It will be understood, that although only two log files are shown in FIG. 1B, that additional applications may be monitored and thus additional log files may be added as necessary or desired (not shown). Moreover, although in some embodiments, each application and thus each log in replication log 150 may have its own associated filter driver 130, in other embodiments, a single filter driver may be deployed and configured for use with multiple applications, and such a single filter driver may establish different logs for each application monitored (or store data relating to all applications in a single log).

Additionally, it will be understood that it is not necessary for different filter driver logs to be established for each different application. Rather, as mentioned above, in some embodiments, one or more global filter driver logs may be used, with data for each application being placed in that global log and marked as belonging to a particular application 120 (not shown). With this arrangement, system 100 may differentiate among log entries for data associated with different applications 120 based on indicators or other log information as discussed further below.

Periodically, data agent 125 may pause or quiesce application 120 as is known in the art which may cause the application to temporarily suspend data write operations to data store 135 and allowing pending operations to complete so the application reaches a known "good", "stable" or "recoverable" state (e.g., a point in the data at which essential computing operations are complete to a certain point such that further operation or recovery of the application may occur based on the prior data without the loss of critical information or computing operations essential to the proper further operation the application).

When the application 120 is quiesced, filter driver log 150 is populated based on the write operations allowed to complete by the application, data agent 125 or other replication component may insert a logical marker or indicator at this point in filter driver log data denoting that a "consistency point" has been reached in the data such that application 120 may be fully recovered. This is represented as the "cpt" entry in Log 2 (153) in replication log 150. Once the consistency point is identified and established, data agent 125 may "restart" or "dequiesce" application 120 such that and write operations from application 120 to data store 135 resume and the application may once again continue writing to data store 135 in accordance with normal functionality.

The foregoing notwithstanding, it will be understood that, in some embodiments, although application 120 is quiesced, it need not actually pause or suspend its operation during the quiesce period, but rather may continue to operate substantially normally, and may queue internally or otherwise buffer read/write operations intended for data store 135 (not shown), which may be allowed to complete (i.e., data travel to data store 135) when normal operation resumes.

Periodically, data agent 125 may coordinate with replication manager 160 to copy information from filter driver log 150 to replication logs 155. This operation may be initiated based on any suitable factor such as preset or prescheduled copying intervals, capacity thresholds reached in filter driver log 150, time lapsed since a previous copy operation, replication module 160 requests a copy operation, or based on specific parameters or replication intervals or requirements associated with a particular application, etc. For example, certain data sensitive applications may be copied more frequently than others etc. However, any suitable triggering event and replication interval may be used, if desired.

Copying of data from filter driver log 150 to replication log 160 may occur by transmitting the data through network 157 which may be any type of communication network known in the art such as an Internet-based network, a token ring or TCP/IP-based network, a WAN, LAN or other network topology. Furthermore, in embodiments where source 102 and destination 103 are on the same computer, it may not be necessary to copy the filter driver logs, as data may be copied to replication volumes 175 directly from the filter driver logs 150 (using the same or similar replication manager 165, copy module 170 and replay threads 171).

In some embodiments, data may be transferred such that the order in which the data was stored in the filter driver logs 150 is preserved and may maintain a substantially one to one correspondence with the original filter driver log entries. Thus, logs can be replayed in the order that the write operations occurred, without any substantial reorganization, which facilitates replication of the original production volume.

In addition, the logs may be recreated to reflect the organization of data on filter driver log 150. For example, Logs 1 and 2 in filter driver log 150 (152 and 153 respectively) may be transferred and recreated by replication manager 165 and/or data agent 125 to preserve data and application correspondence established on the source side (e.g., depicted as Log 1 and Log 2 in replication log 155). Thus, for example, log 152 may be recreated in replication log 155 (as log 1) in substantially the same way it was arranged in filter driver log 150. In other embodiments, however, data may be transferred and stored in a different order without preserving source side correlations and rearranged on or during transfer to or upon arrival in replication volumes 175.

In operation, replication manager 165 may monitor and supervise the copying of data from filter driver log 150 to replication log 155. In some embodiments, this operation may be further coordinated by optional storage manager 106, based, in part, on system configuration or preference information in data store 107.

In some embodiments, the transferred data may retain the data structure used in filter driver log 150 or may be changed, modified or rearranged to reflect, conform or otherwise interoperate with, the management particulars of replication module 165. For example, certain referential indicators associated with the data may be modified or conformed to meet the requirements or be consistent within referential system of replication manager 160. However, in preferred embodiments, referential integrity of the data is maintained between source and destination sections.

As data arrives in replication log 155 (or at some point in time thereafter), replication manager 165 may instantiate a copy module 170 to facilitate movement of data from replication log 155 (e.g., including Log 1 and Log 2) to one or more replication volumes 175. In some embodiments, copy module 170 may move substantially all data from replication logs 155 to replication volumes 175 regardless of the application or data type. This may occur in a substantially sequential fashion such as based on first-in, first-out (FIFO) approach where data relating to a particular application is replicated from one consistency point to another before moving on to another application.

Thus, after one application has completed replication, copy module 170 may move to another application until a consistency point is reached and then move to another application, etc. In other embodiments, copy module 170 may copy data relating to multiple application types based on temporal information such as a time stamp or FIFO regardless of application or data type.

In other embodiments, however, specialized replay threads 171 may be employed that operate on a specific type of data or application. Thus, for example, replication manager 165 and/or copy module 170 may instantiate numerous replay threads 171, each dedicated to a certain data or application type. In operation, such replay threads may operate on the replication logs 155 in parallel by simultaneously traversing the logs in search of specific information, thereby increasing the rate at which information is copied to replication logs 175.

Generally, such copy operations occur after replication log 155 begins to be populated, or when a specific threshold is reached. For example, during the seeding process, data agent 125, or other system process (such as storage manager 105) may evaluate an application 120, and based on certain system management parameters, preferences and/or other considerations associated with the application (e.g., data size, frequency of replication, system or user preferences, etc.), agent 125 may "map" or correlate application data to one or more replication volumes 175. This may involve generating or allocating one or more appropriate replay threads 171 to move data from replication logs 155 to replication volumes 175. In other embodiments, data agent 125 may communicate with other system components when making correlation and instantiation decisions. For example, data agent 125 may communicate with replication manager 165 and/or optional storage manager 106 when deciding how to map data or allocate replay threads.

System or user preference information may aid in this decision process, and thus agent 125 may consult with preference data store 108 when making mapping and instantiation decisions. Likewise, optional storage manager 106 and replication manager 165 may also consult with associated preference data located in data stores 107 and 178, respectively, when they are involved in making mapping or correlation decisions. Preference data may indicate mappings according user or system preferences or arbitrarily. This information also may be used subsequently by replication manager 165 when instantiating replay threads 171.

For example, data agent 125 and/or other components mentioned above may map a certain application to one replication volume 175, or may parse or separate application data for storage across multiple replication volumes depending on preferences or system management objectives (e.g., desired frequency of copy operations, consolidation of application data, desired level of data protection, etc.).

In addition, parsing of data across replication volumes 175 may occur based on application type (certain applications spread across multiple volumes), data type, temporal considerations (e.g., data for a specified time period is stored on a particular volume), size considerations (e.g., data up to a certain size is stored on one volume), relative importance of data, conservation of memory space, etc. Any suitable parsing criteria may be used if desired to facilitate recall, storage or management of application data.

After mapping decisions have been made and this information communicated to replication manager 165, the replication manager may generate replay threads 171 based on mapping information. For example, appropriate replay threads may be instantiated for each application to facilitate movement of data from replication log 155 to the appropriate replication volume 175. In operation, replay threads 171 may traverse replication log 155 in parallel for certain data (such as specific data or application) and copy that data to certain locations on one or more replication volumes 175 based on certain data paths established from the mapping information.

More particularly, replay threads 171 may be configured, instantiated and deployed by replication manager 165 based on various system or user defined parameters. Replication manager 165 may be generally capable of generating numerous specific types of replay threads depending on the application or data be moved to replication volumes 175 as described above.

As mentioned above, initially, when data agent 125 is installed or enabled on client computer 105, it may evaluate application 120, and may determine the application's organizational structure which may include folder, directory and file information, and may define a complete "set" of such information and other data to be replicated for the application such that suitable baseline data representing the current operational state is identified. In some instances, this may require the examination and identification of data related to application operations occurring prior to the installation of data agent 125. This may further include identifying general configuration and operational information regarding the application and other existing data necessary for the restoration of the application.

This group of initial information may be copied over to replication logs 175 as part of the initial "seeding" or "initialization" process. After this seeding process is complete, data replication may occur on a substantially continuous fashion based on data transfers occurring between application(s) 120 and data store 135.

Based on this set of information, and on certain system configuration information, which may be received from optional storage manager 106 and/or replication manager 178 and associated data stores, data agent 125 may communicate certain pairing or correlation information to replication manager 165 which may be used to instantiate specific instances of copy module 170 and/or replay threads 171. In some embodiments, this correlation information is specific to a certain data or file type and may provide the module or thread with "one to one" correspondence to a particular replication volume from the replication log.

Thus, in operation, replication manager 165 may instantiate an appropriate copy module 170 or number of replay threads 171 based on the application 120 being replicated. In the case where replay threads are used, multiple threads 171 may traverse the replication log in parallel and scan the entries to identify the data or files that each replay thread is concerned with. When a certain replay thread 171 encounters an entry of interest, that entry is copied from the replication log 155 to a replication volume 175 in accordance with a path established based on the correlation or pairing information provided by data agent 125 and other system components as further described herein. This typically includes a copy of a time stamp or other temporal information that enables synchronous replay. In some embodiments, however, manager 165 may copy through log entries, for example, when log entries are written substantially in the same order as write operations etc.

Thus, for example, based on time stamp information, the replay threads 171 may reconstitute the proper order of replication data such that the data is stored on one or more replication volumes 175 in the proper order (e.g., the order it was intended to be written to data store 135) so that the data may be subsequently retrieved, recalled or otherwise accessed and may be used to accurately restore the state of the application as it existed at a given point in time (i.e., further facilitating synchronous replay).

One way this may be performed is by writing data to replication logs 175 based on time stamp information. As replay threads 171 traverse replication log 155, and data may be arranged on replication volume 175 in time ascending (or descending) order, ensuring that certain data manipulation operations occur on the proper data and in the proper order, etc. Another way this may be accomplished is based on a linked-list or ordered sequence of events approach where data may be reconstructed based on an assigned order (rather than on time stamp information).

Instantiated replay threads 171 may operate in parallel (or sequentially) to scan a replication log for entries to copy for a certain application. Each replay thread, which may be responsible for replicating certain data for an application 120, may continue to scan replication log 155 (or a log within replication log 155 such as LOG 1) until a consistency point is encountered. When this occurs, the replay thread may notify replication manager 165 that it has reached a consistency point. After all active replay threads for a specific application notify replication manager 165 that a consistency point has been reached, the replication process for data indicative of that point in time, is complete.

At this point, replication manager 165 may suspend further copy operations by reply threads 171 (or, in some embodiments, copy module 170), and issue a system command to take a snapshot or other copy of the replication volumes 175 (e.g., using conventional techniques known in the art (not shown)). As a result of taking a snapshot at this particular point in time, the snapshot represents a complete set of recoverable application data at the point in time associated with the consistency point inserted at source 102 of system 100 (i.e., the time at which the quiesced application suspended data write and allowed pending write operations to complete operations).

After the snapshot is taken, a message may be sent to other certain system management components such as a snapshot manager (not shown) and/or optional storage manager 106, indicating the replication process is complete to the time stamp associated with consistency point. At this point, replication manager 165 may instruct copy operations associated with replay threads 171 to resume.

The message may include a time stamp of the snapshot and a time stamp of the consistency point along with location information of the snapshot(s). The time stamp associated with the snapshot may be correlated with the time stamp associated with consistency point in system 100 such that the system may refer to the snapshot as a known good copy of application data as of the time stamp associated with the consistency point (i.e., associate the snapshot taken later with consistency point generated earlier in time). This allows management components in system 100 to equate the snapshot taken at later point in time with the consistency point previously generated so the replication data reflecting application operation at the consistency point may be located and retrieved to restore the application to the state it was in at the time indicated by the consistency point.

This provides system 100 with information regarding the location of the replication copy, the applicable time of the copy (i.e., the last known good data) and the time and location from which the snapshot was taken for system management purposes. When replication manager 165 receives the completion message, it may further optionally notify data agent 125 or other system management components with the information described above. This allows the system to associate the time of the consistency point at the source with the location of the replication data such that the replication copy may be retrieved in a restore operation rather than relying on or referring to the original production volume data.

For example, optional storage manager 106 and/or data agent 125 or other system management components may store the location of the snapshot in and index (such as index 110) or data store such as data stores 108 and 178, and view this information as a direct copy of the production volume (e.g., data store 135) at a certain point in time. Thus, system 100 may associate the time of the snapshot with the time of the consistency point such that the snapshot is considered by the system as taken at the time of the consistency point and the location of the snapshot is considered the location of the original by the system and not a replication volume.

Moreover, system 100 may also track the location of application data in the replication logs 155 and replication volumes 175. For example, the location of the data in the replication volumes and time that application data is copied from replication logs 155 to replication volumes 175 may also be tracked in index 110 or data stores 108 and 178 with respect to consistency points as described above. This may allow the system to consult replication volumes 175 for application data under certain circumstances, if desired (e.g., if snapshots unavailable or if a snapshot has not yet been made of the desired data). As the memory locations replication volumes are overwritten or reallocated, system information may be updated to reflect replication volumes contents and data availability.

Similarly, system 100 may keep track of data remaining in replication logs 155 (e.g., via replication manager 165). This may be useful in cases where application data is present in replication logs 155 but has not yet been copied to replication volumes 175. This allows system 100 to retrieve such data by performing the necessary copy operations with copy module 170 so the application data is moved to replication volumes 175 and may be subsequently accessed by the system. In other embodiments, the information in replication logs 155 may be traversed by replay threads 171 (or copy module 170) and copied directly to memory locations in source 102 when the application data is requested on an immediate basis.

In certain embodiments, system 100 may periodically perform conventional backup operations on the replication volumes or on the snapshots of replication volumes 175 for use in future restore operations and provide the appropriate tracking information to appropriate management components in system 100 (not shown). For example, such copies may be backup or archive copies made in accordance with a storage policy or system or user preference. Such copies may be stored in a backup format that is optimized for compression and efficient long-term storage and may be stored on media with slower retrieval times than other types of secondary copies and media. In some cases, backup or archive copies may be stored at an offsite location and may be accessed in accordance with certain specified information lifecycle management ("ILM") preferences.

Creating backups of such replication copies allows the system to access copies of production volume data without having to use client resources or interrupt or suspend data operations into data store 135 thereby minimizing impact of backup operations on client applications. Further operation of the systems and methods are provided in conjunction with FIGS. 2-7 provided further herein.

Figure 1C:
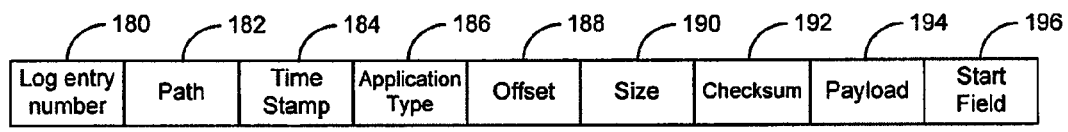
FIG. 1C is an exemplary illustration of a data structure in accordance with one embodiment of the present invention.

Referring now to FIG. 1C, an exemplary embodiment of a filter driver log entry is illustrated that may be used in conjunction with some embodiments of the present invention. As shown, the filter driver log entry may be a data word organized as shown, including, log entry number field 180, path field 182, time stamp field 184, application type field 186, offset field 188, size field 190, checksum field 192, payload field 194 and start field 196.

Filter driver 130 and or data agent 125 may construct such entries based solely on information available in the data stream between application 120 to data store 135 or in conjunction with other system information such as time stamp information. In other embodiments, filter driver log entries may be copies or portions of some or all of the data transferred from application 120 to data store 135. In still other embodiments, the log entries may be enriched with other useful system or application data available on client 105 or within system 100 (e.g., with metdata or descriptive or useful information).

Log entry field 180 may include information regarding the entry number assigned to particular entry for system management purposes such that entries may be tracked and reordered relative to one another if necessary or desired. As mentioned herein, log entries may be arranged in a temporally sequential manner based on the application write operation on which the entry is based.

Path field 182 may include information regarding the path the log entry traveled (through the application and associated resources) to arrive in log 150. Moreover, path field 182 may include information relating to the log entry's replication volume destination, and file name, and thus may be useful, for example, in establishing or confirming correlation or pairing information used in replay threads 171 and in moving data to replication volumes or other locations.

Time stamp field 184 may include information relating to the time which the data write occurred on which the entry is based. In some embodiments, the time stamp may be provided by the application relative to application time, in other embodiments, the time stamp may be provided by filter driver 130 relative to system time. In certain embodiments, application and filter driver times may be identical and thus may be the same value. However, in systems where this is not the case, it may be desirable to use application time, for example, when this time is useful in determining data order, etc.

Application type field 186 may include information identifying the application type that generates payload 194 (e.g., MICROSOFT OUTLOOK, SHAREPOINT, ORACLE, MICROSOFT WORD, MICROSOFT INTERNET EXPLORER, etc.).

Offset field 188 may include information relating to segments within the data block as is known in the art and may indicate the space between the beginning of the log entry (field 180) and the payload section 194 and/or start field 196. This allows quick access or indexing to any part on the log entry. In other embodiments, this may merely indicate the offset of the payload within its source file.

Size field 190 may include information relating to the size of various segments within the data word as is known in the art (e.g., the number of bits in each or some of the fields 180-196) or may indicate the size of the payload section 194.

Checksum field 192 may include information regarding the arithmetic sum (or other calculation such as a hash) of some or all of the fields 180-196 in the log entry as is known in the art and is used primarily as an error checking feature to ensure that the log entry, when created and subsequently transmitted, contains the expected number of bits and has not been corrupted or otherwise impermissibly changed.

Payload field 194 typically includes information relating to the data written from application 120 to data store 135. This information generally represents the application data selected by filter driver 130 for replication and includes important information for the ongoing operation or reconstitution of application 120.

In some embodiments, a complete application file may be obtained as payload section 194 (with the payload section optionally having a somewhat variable size). In other embodiments partial files or blocks of a file may be obtained or conveyed in payload section 194.

It will be understood that the illustrative filter driver log entry shown in FIG. 1C merely represents one possible embodiment of log entry suitable for use with the present invention and that other arrangements may be used if desired. For example, additional data fields may be added or some of the fields shown removed as desired in order to achieve certain data or management goals such as the conservation of memory, optimize speed or to maximize the amount of information in each log entry.

Furthermore, it will be appreciated from the foregoing that system 100 and the illustrative filter driver log entry above merely represent one possible arrangement of information and resources that may be used to perform the replication functions of the present invention and that other arrangements may be used, if desired. Certain other aspects of the invention may be further understood by considering the flow chart 200 of FIG. 2 which sets forth some of the steps that may be involved in the replication process introduced above.

Figure 2:
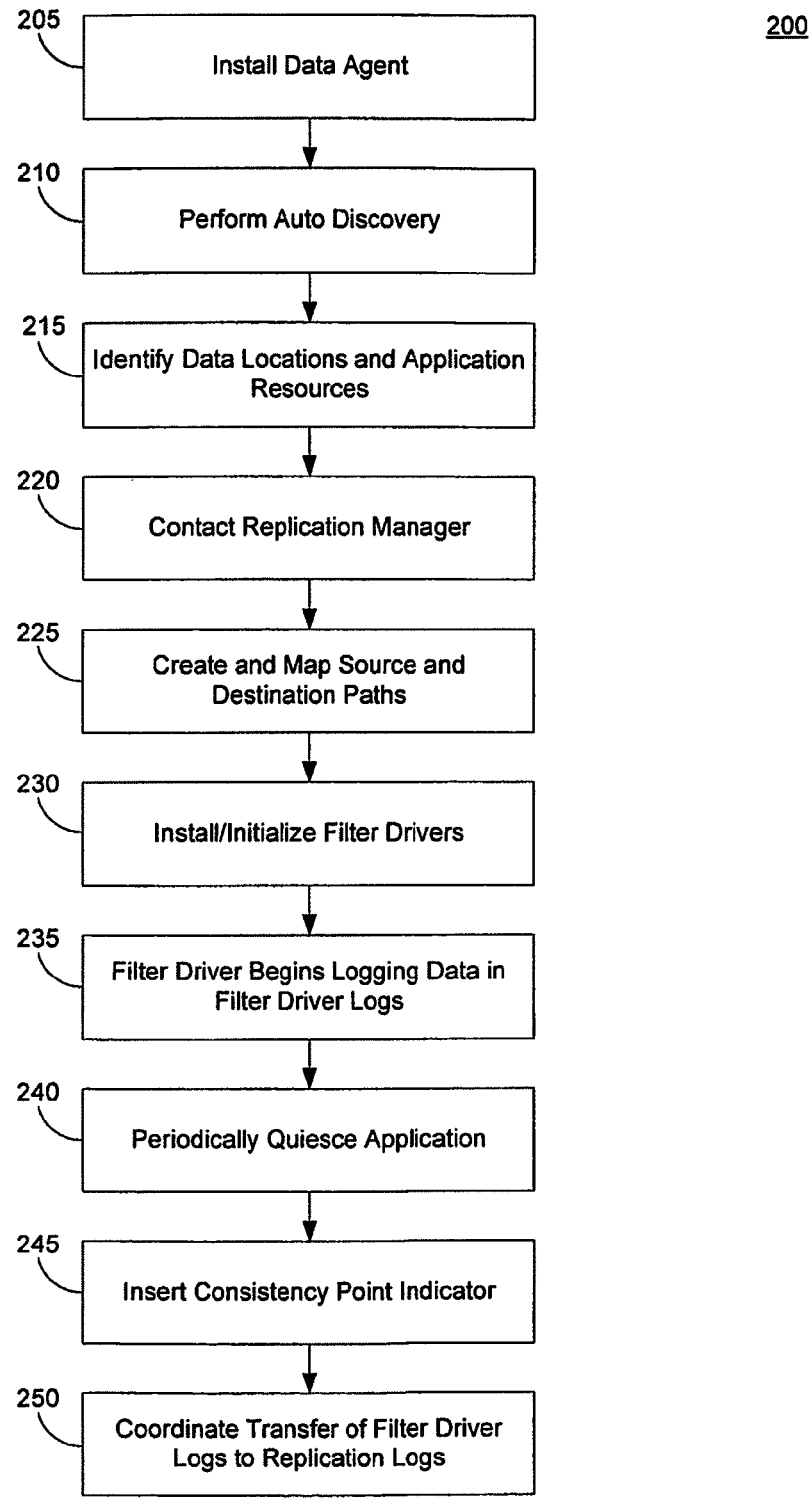
FIG. 2 is a flow diagram illustrating some of the steps involved in replicating application data according to an embodiment of the invention.

As shown in FIG. 2, the replication process in accordance with certain aspects of the present invention may begin at step 205 with the installation of one or more data agent(s) on a client computer. The data agent may be installed remotely from other portions of the system based on a need or to conform with certain backup directives or resident storage policies (or may be installed locally by a system user as desired). Installation may occur in accordance with conventional means known in the art including the deployment and installation of all necessary object code files and supporting software.

In some embodiments, a data agent may be installed for each application of interest or one or more data agents may be installed for a more numerous number of applications. Furthermore, in some embodiments, an installation guide such as a wizard or other program may recommend the appropriate number and type of data agents to install (which may be performed substantially automatically based on application and system configuration information).

Next at step 210, installed data agents may perform certain auto-discovery routines in order to determine basic system and application information. In some embodiments, the auto-discovery routines may be considered part of the installation process. For example, a data agent may begin the auto-discovery process by scanning and evaluating the folder and directory structure of the client computer and subject application. This allows the data agent to identify and locate files or folders or other information necessary to replicate the current operating state of application of interest.

In certain embodiments, the scanning and evaluation process may involve scanning multiple physical and/or logical volumes within a given network or enterprise to locate the data and system configuration information necessary for data replication.

After the appropriate resources have been discovered and examined, the data agent may identify, arrange, coordinate and queue the necessary data within various locations or instances of the application to establish a platform for proper data replication (step 215). In many instances, this may be a precursor step for performing the initial seeding operation described above.

Next, at step 220, a data agent may contact a replication manager and notify the manager that a replication platform is being established and that a data correlation or pairing analysis is in process and that such information regarding the data correlation is forthcoming.

Concurrently, the data agent may also request information from the replication manager and other network management components for any information that may bear on, or be related to, the correlation or mapping process. For example, a data store containing preference information associated with a storage manager or replication manager may be consulted for correlation or pairing information. Based on this information, data paths may be identified and used by replay threads when copying data from replication logs to certain specified replication volumes (step 225). Default paths and agent preferences may also be used in some embodiments.

Next, at step 230, filter drivers may be installed or initialized based on information obtained by the data agent during the installation process. For example, appropriate filter drivers may be deployed by a data agent in the stack of an I/O buffer in data path between application and its associated production volume data store. The filter driver may intercept, snoop, parse, or otherwise supervise some or all read/write operations from the application to its associated data store.

Generally, the filter driver may be programmed to select certain data and copy that data to filter driver log as is known in the art. For example, this may include data identified by a data agent in during setup or through auto-discovery. Filter drivers may be application specific or programmed to operate on multiple application types. In some embodiments, filter drivers may be part of or closely associated with its sponsoring data agent and may be specialized to operate on the type of application being replicated by that agent. Enabling the filter driver allows it to populate an associated filter driver log with log entries from application data passed from the application to its data store. When the filter driver is disabled, data may pass directly through to the data store and no data may be sent to the filter driver log.

As shown in step 235, the deployed filter drivers may populate the filter driver log in a temporally sequential manner such that operations and data are recorded in time descending (or ascending) order (e.g., first operation at the top and last operation at the bottom using a linked list or other data structure). For example, an operation L1, denoting a database log write operation, may occur at time $t_0$ whereas operation D1, denoting a database commit write operation may occur at time $t_{0+n}$, etc.

The information in filter driver log may be stored in any suitable data structure and may include a basic two column structure, wherein the information in a first column may indicate the type of data operation performed and its position in the log indicates the order of the operations relative to other operations in the log. The information in the second column may indicate the payload data associated with the data operation indicated by the first column. However, it will be understood other data structures may be used if desired, as long as the order of operations and associated data may be recreated by a replication manager (e.g., as shown in FIG. 1C).

In operation, deployed filter drivers may continue to populate the filter driver log with certain application data specified by data agent. Periodically, the data agent or other system component may pause or quiesce the application as is known in the art that may cause the application to temporarily suspend operations once the application reaches a recoverable state (step 240). Once the write operations are suspended and the associated filter driver log is populated based on the write operations allowed to complete by the application, the data agent or other replication system component may insert a logical marker or indicator at this point in filter driver log data denoting that a consistency point has been reached in the data such that application 120 may be fully recovered or that further stable operation from that point going forward is ensured (step 245).

Once the consistency point is identified and established, the data agent may de-quiesce the application such that write operations from the application to its associated data store resume and the application may once again continue writing to the data store in accordance with its normal functionality.

Periodically, the data agent or other system management component may coordinate with the replication manager to copy information from the filter driver log to one or more replication logs (step 250). This operation may be initiated based on any suitable factor or consideration provided herein.

Data may be transferred such that the order in which the data was stored in the filter driver logs is preserved and may maintain a substantially one to one correspondence with the original filter driver log entries. In other embodiments, however, data may be transferred and stored in a different order without preserving previous correlations and rearranged on or during transfer to or upon arrival in replication volumes.

In operation, the replication manager may monitor and supervise the copying of data from the filter driver log to the replication log(s). In some embodiments, this operation may be further coordinated by other system components and may be based, in part, on system configuration or preference information associated with those components.

The transferred data may retain the data structure used in the filter driver log or may be changed or modified or rearranged to reflect, conform or otherwise interoperate with, the management particulars of the replication module. For example, certain referential indicators associated with the data may be modified or conformed to meet the requirements or be consistent within referential system of the replication manager. However, in preferred embodiments, referential integrity of the data is maintained between the filter driver logs and replication logs.

Figure 3:
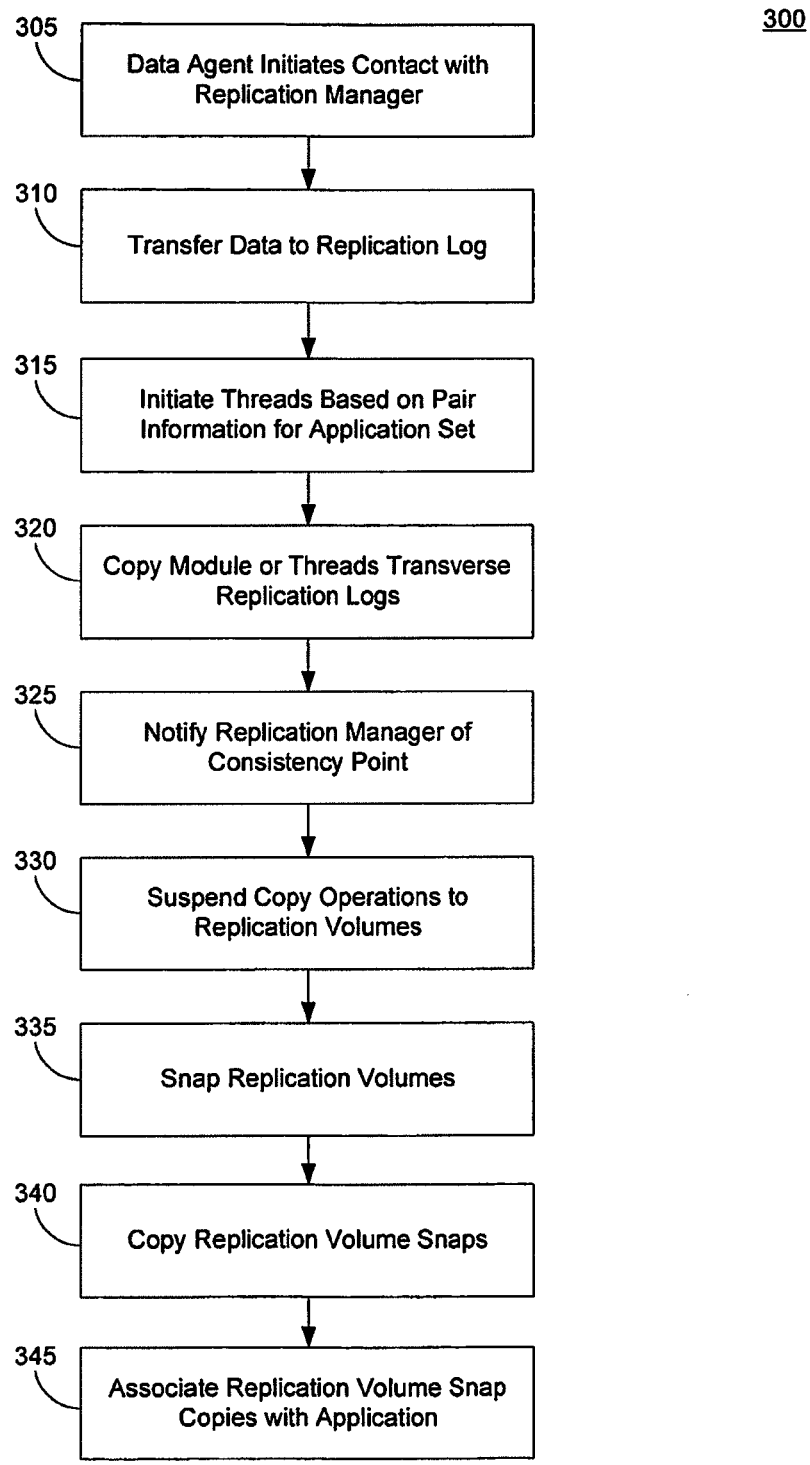
FIG. 3 is a flow diagram illustrating the process of creating a snapshot copy of replicated data based on log entries according to an embodiment of the invention.

Referring now to flowchart 300 in FIG. 3, additional aspects of the replication systems and methods may be further appreciated. As shown, the data agent or other management component may communicate with the replication manager as described above (step 305).

Next at step 310, the replication manager may be notified that the replication process has begun and that data transfer from the filter driver log to the replication log requires coordination.

This may be accomplished by a replication manager or data agent opening a network path or a communication socket between source and destination computing devices. Log entries may be transferred as described above to populate the replication log. As the replication log is populated, the replication manager may obtain configuration information from a storage manager or other system management component that identifies aspects of the set of information being transferred as well as identifying pairing information that correlates certain types of replication data with certain replication volumes or other storage destinations.

After the replication manager receives pairing and correlation information as described above, it may initialize replay threads to begin the transfer of data from the replication log to one or more replication volumes (step 315). Replay threads may be instantiated and particularized based on pairing or correlation information received from a management component and based on certain system configuration information such as available replication volumes, data path information, and the type of information in the transferred data set which may vary from application to application, etc.

The replication manager may instantiate one or more replay threads that correlates certain data types with certain data volumes and may specify primary and alternate data paths. In some embodiments, the replication manager may instantiate multiple replay threads based on the pairing information and data types. For example, a first thread may be directed to processing a first data type, such as database log entries, and a second thread processing a second type of data or type of storage operation such as database commits, etc.

In such embodiments, the replay threads may traverse the replication log until a consistency point is encountered (step 320). When this occurs, the replay thread may notify replication manager that it has completed its scan of the replication log (step 325). After all active replay threads notify replication manager that a consistency point has been reached, the replication process, up to a certain point in time for a specific application, is complete. Thus, all data from the log up to that point has been copied to one or more replication volumes.

At this point, the replication manager may suspend further copy operations by the reply threads, and a issue a system command take a snapshot of the replication volumes (e.g., using conventional techniques known in the art (steps 330 and 335)) or perform some other storage operation such as backup, etc.

As a result of taking a snapshot at this particular point in time, the snapshot represents a complete set of recoverable application data up to the point in time associated with the consistency point (i.e., the time at which the quiesced application suspended normal data write operations). After the snapshot is taken, a message may be sent to other certain system management components such as a snapshot manager and/or optional storage manager 106, indicating the replication process is complete up to the time stamp associated with consistency point. At this point, the replication manager may instruct copy operations associated with replay threads to resume.

At this point, the snapshot of the replication volumes represent a complete set of recoverable application data up to the consistency point. After the snapshot is taken, a message may be sent to a storage manager or other management component indicating the replication process is complete which may include a time stamp of the snapshot and the consistency point along with location information within the replication volumes. This provides the system with information regarding the location of the replication copy, the applicable time of the copy (i.e., the last known good data) and the time at which the snapshot was taken for system management purposes.

Subsequently, storage manager may store the location of the snapshot in its index and view this information as a direct copy of the production volume at a certain point in time. In certain embodiments, the system may periodically perform conventional backup operations on replication copies (step 340) for use in future restore operations and provide the appropriate tracking information to manager. Creating such replication copies allows the system to access copies of the production volume without having to use client resources or interrupt or suspend data operations into client data store thereby minimizing impact of backup operations on client applications. Thus, for example, copies of the replication volumes can be made, etc.

Figure 4:
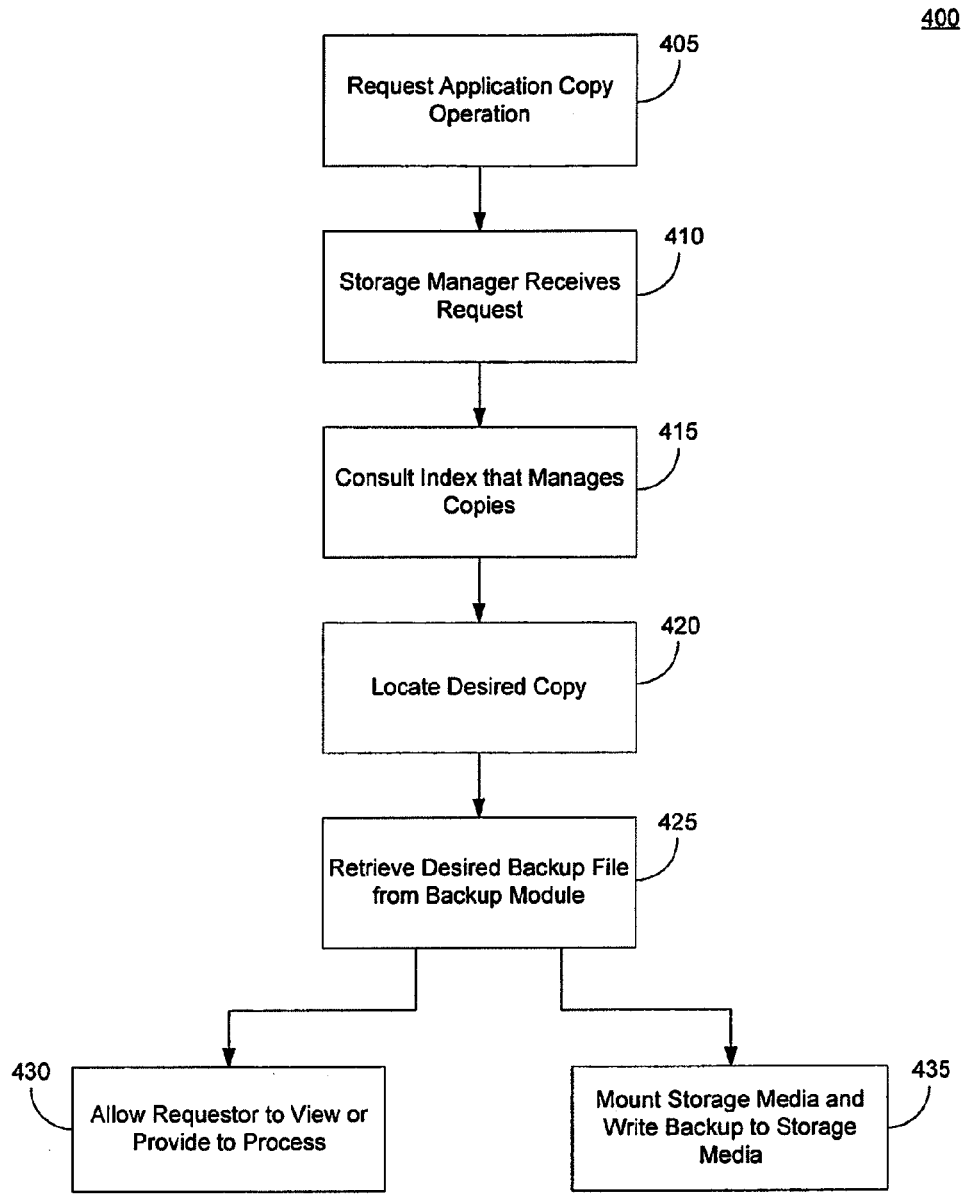
FIG. 4 is a flow diagram illustrating some of the steps involved in the process of accessing certain replicated data according to an embodiment of the invention.

Referring now to flowchart 400 in FIG. 4, additional aspects of the replication systems and methods may be further appreciated. As illustrated, is some embodiments of the present invention, the system may access snapshot copies replication data substantially directly, in a manner similar to or in the same way that the system may view production level data. For example, at step 405, a system user or other process in the system may wish to obtain a copy of a past or most recent version of replication data for a particular application (e.g., to perform an application restore operation). This may be accomplished by providing such a request as is known in the art to a storage management component in the system such as a storage manager or replication manager, or, by placing a query to a system browsing or access program that has familiarity with and access to the system index and storage volumes (step 410).

Next, the data request may be processed by the system component receiving the request and may include parsing the request into discrete queries and searching system databases or information stores identified as having potentially responsive information. This may result in a list of system indexes or data stores that may manage or track the requested information. Once such indexes are located, the may be consulted to locate the particular snapshot copy, backup, or other copy desired (step 415).

Next, at step 420, the requesting user or system process may use the index to locate and retrieve the desired snapshot or snapshot backup. In some embodiments, the system management components may access the desired snapshots or other copies substantially directly in the same way production volume data is accessed.

This may occur, because, as described above, during the replication process, snapshot and other copy location information may be stored in one or more indexes used by system management components such as a replication manager, a data agent which replicated the desired snapshot or a storage manager component. Thus, when snapshot location information is requested, it may be accessed via the path and location specified in an index in substantially the same way other information represented in the index is retrieved.

Next, at step 425 the desired information may be retrieved using conventional techniques known in the art. For example, this may involve consulting and retrieving the requested information from a directly from a replication volume or from a storage volume that manages and maintains copies of the replicated source data. Moreover, in certain instances, the storage volume that manages secondary copies may be backed up to second or third tier storage media such as magnetic tapes or optical disks. In some embodiments, such media may be located and mounted in a replay device such as a tape or optical for retrieval (step 435). After the requested information has been located and retrieved, it may be provided to the requesting process or user via and appropriate means (step 430). For example, in the case of a user, the information may be provided via a browser or other interactive interface. In the case of a process, the information may be provided through an appropriate communication channel such as a socket or network connection and may be provided in a format suitable for use with the requesting process.

Figure 5:
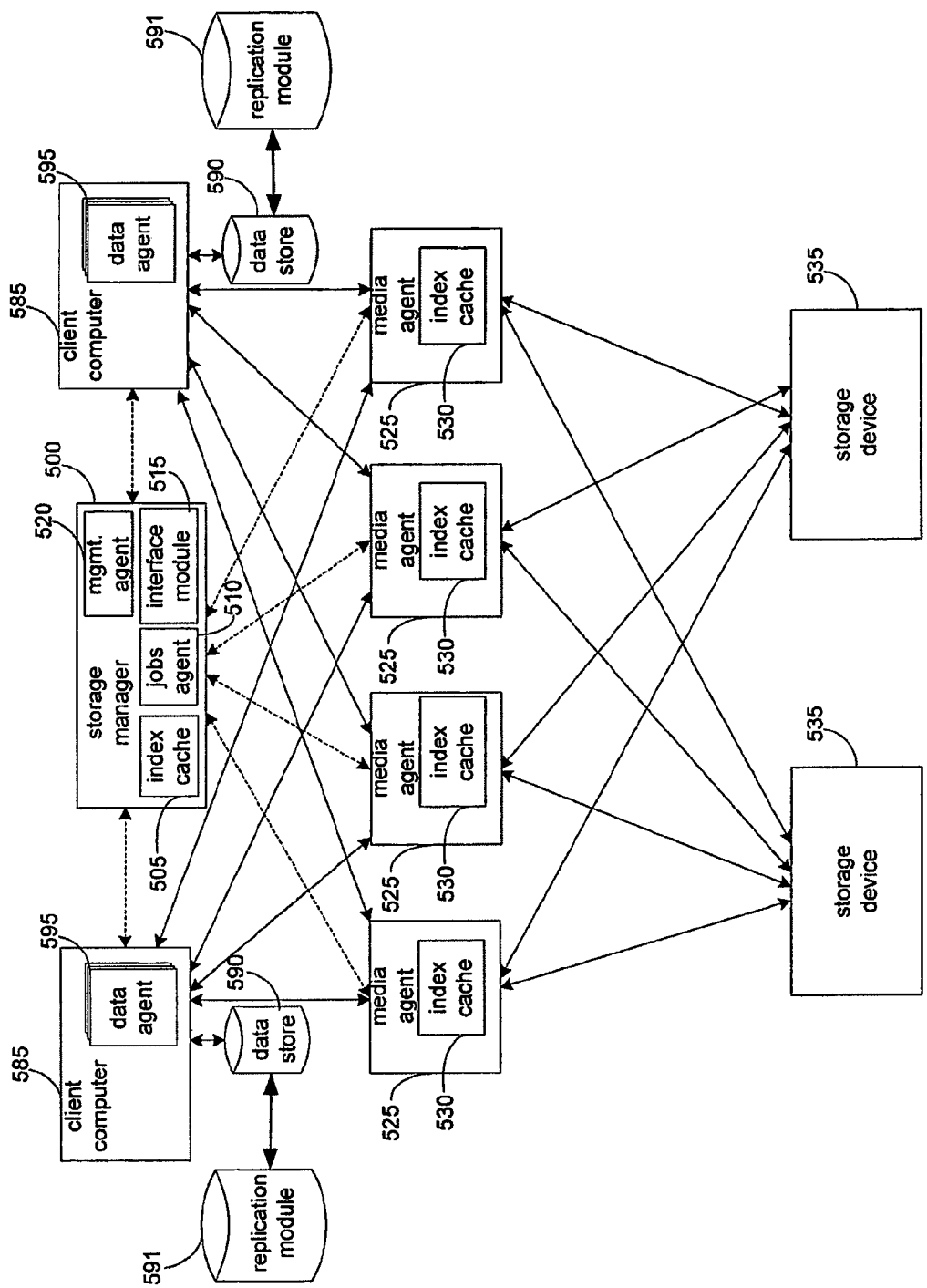
FIG. 5 is a block diagram of an exemplary storage operation system that may be used to perform storage operations in on electronic data in a computer system in accordance with an embodiment of the invention.

FIG. 5 presents a block diagram of one possible storage operation system that may employ some or all of the aspects of the inventions described herein. For example, as shown, the storage operation cell may include a storage management component, such as storage manager 500 and one or more of the following: a client 585, a data store 590, a data agent 595, a media management component, such as a media agent 525, a media management component index cache 530, a storage device 535, a storage management component index cache 505, a jobs agent 510, an interface module 515, and a management agent 520. The system and elements thereof are exemplary of a modular storage management system such as that further described in application Ser. No. 09/610,738, which is incorporated herein by reference in its entirety [UPDATE]. A storage operation cell may generally include combinations of hardware and software components directed to performing storage operations on electronic data. Exemplary storage operation cells according to embodiments of the invention include CommCells as embodied in the QNet storage management system and the QiNetix storage management system by CommVault Systems of Oceanport, N.J., and as further described in Application Ser. No. 60/482,305 [UPDATE] and application Ser. No. 09/354,058 which are hereby incorporated by reference in their entirety.

Storage operations cells may be related to backup cells and may provide all of the functionality of backup cells as further described in application Ser. No. 09/354,058 [UPDATE]. Storage operation cells may also perform additional types of storage operations and provided by other types of storage management functionality. Storage operation cells performing storage operations may also include, but are not limited to, creation, storage, retrieval, migration, deletion, and tracking of primary or production volume data, secondary volume data, primary copies, secondary copies, auxiliary copies, snapshot copies, backup copies, incremental copies, differential copies, Hierarchical Storage Management ("HSM") copies, archive copies, Information Lifecycle Management ("ILM") copies, replication copies and other types of copies and versions of electronic data. Storage operation cells may also include an integrated management console for providing users or system processes to interface with, in order to perform storage operations on electronic data.

A storage operation cell may be organized and associated with other storage operation cells by forming a logical hierarchy among various components of a storage management system. Storage operation cells generally include a storage manager 500, and, one or more other components including, but not limited to, a client computer 585 (similar to or the same as client computer 105 described above), a data agent 595 (similar to or the same as client data agent 125, described above) a media agent 525, a storage device 535, replication module 591 (similar to or the same as replication module 160, described above), and other components.

For example, a storage operation cell may contain a data agent 595 which may generally be a software module that is responsible for performing storage operations related to client computer 585 data that may be stored in data store 590 or another memory location. For example, data agent 595 may provide archiving, migrating, replication and recovery of client computer data. A data agent may perform storage or replication operations in accordance with one or more storage policies, preferences or as otherwise described herein.

A storage policy is generally a data structure or other information which includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Storage policies may be stored to a storage manager index, to archive media as metadata for use in restore operations or other storage operations, or to other locations or components of the system.

Each client computer 585 generally has at least one data agent 595 and the system may support many client computers 585. The system may also generally provide a plurality of data agents 595 each of which may intend to perform storage and replication operations related to data associated with a different application, for example, in order to backup, migrate, replicate and recover application specific data. For example, different individual data agents 595 may be designed to handle MICROSOFT EXCHANGE data, LOTUS NOTES data, MICROSOFT WINDOWS 2000 file system data, MICROSOFT ACTIVE DIRECTORY OBJECTS data, and other types of data known in the art.

If a client computer 585 includes two or more types of data, one data agent 595 may generally be required for each data type in order to perform storage operations related to client computer 585 data. For example, to backup, migrate, replicate and restore all of the data on a MICROSOFT EXCHANGE 2000 server, the client computer 585 may use one MICROSOFT EXCHANGE 2000 mailbox data agent 595 to backup the EXCHANGE 2000 mailboxes, one MICROSOFT EXCHANGE 2000 database data agent 595 to backup the EXCHANGE 2000 databases, one MICROSOFT EXCHANGE 2000 public folder data agent 595 to backup the EXCHANGE 2000 public folders, and one MICROSOFT WINDOWS 2000 file system data agent 595 to backup the client computer's 585 file system. These data agents 595 may be treated as four separate data agents 595 by the system even though they reside on the same client computer 585. Separate data agents may be combined to form a virtual data agent (not shown) for performing storage operations related to a specific application. Thus, the four separate data agents of the previous example may be combined as a virtual data agent suitable for performing storage operations related to all types of MICROSOFT EXCHANGE 2000 and/or WINDOWS 2000 data.

Storage manager 500 may generally be a software module or application that coordinates and controls storage operations performed by the storage operation cell. Storage manager 500 may communicate with all elements of the storage operation cell including client computers 585, data agents 595, media management components such as media agents 525, and storage devices 535 regarding storage operations, for example, to initiate and manage system backups, migrations, replication operations and recoveries. Storage manager 500 may also communicate with other storage operation cells.

Storage manager 500 may include a jobs agent 510 software module which monitors the status of all storage operations that have been performed, that are being performed, or that are scheduled to be performed by the storage operation cell. The jobs agent 510 may be communicatively coupled with an interface agent 515 software module. The interface agent 515 may provide presentation logic, such as a graphical user interface ("GUI"), an application program interface ("API"), or other interface by which users and system processes may be able to retrieve information about the status of storage operations and issue instructions to the storage operations cell regarding the performance of storage operations. For example, a user may modify the schedule of a number of pending replication operations and related snapshot copies or other types of copies. As another example, a user may use the GUI to view the status of all storage operations currently pending in all storage operation cells or the status of particular components in a storage operation cell.

The storage manager 500 may also include a management agent software module 520. The management agent 520 may generally provide an interface with other management components 500 in other storage operations cells through which information and instructions regarding storage operations may be conveyed. For example, a management agent 520 in a first storage operation cell can communicate with a management agent 520 in a second storage operation cell regarding the status of storage operations in the second storage operation cell. A management agent 520 in a first storage operation cell may communicate with a management agent 520 in a second storage operation cell to control the storage manager 500 (and other components) of the second storage operation cell via management agent 520 contained in the storage manager 500 of the second storage operation cell. The management agent 520 in the first storage operation cell may communicate directly with and control the components in the second storage management cell and bypasses the storage manager 500 in the second storage management cell. Storage operation cells can thus be organized hierarchically among cells.

A media agent 525 may be a software module that conducts data, as directed by a storage manager 500, between client computers 585 and one or more storage devices 535. The media agent 525 may be communicatively coupled with and generally configured to control one or more storage devices 535. For example, the media agent 525 may instruct a storage device 535 to use a robotic arm or other means to load or remove a media cartridge, and to archive, migrate, or restore application specific data. The media agent 525 may generally communicate with storage devices 535 via a local bus such as a SCSI adaptor. In some embodiments, the storage device 535 may be communicatively coupled to the media agent 525 via a Storage Area Network ("SAN").

Each media agent 525 may maintain an index cache 530 which stores index data the system generates during storage operations as further described herein. For example, storage operations for MICROSOFT EXCHANGE data generate index data. Index data may include, for example, information regarding the location of the stored data on a particular media, information regarding the content of the data stored such as file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Index data may thus provide the system with an efficient mechanism for performing storage operations including locating user files for recovery operations and for managing and tracking stored data. The system generally maintains two copies of the index data regarding particular stored data. A first copy may generally be stored with the data copied to a storage device 535. Thus, a tape may contain the stored data as well as index information related to the stored data. In the event of a system restore, the index data stored with the stored data may be used to rebuild a media management component index 530 or other index useful in performing storage operations. In addition, the media agent 525 that controls the storage operation may also write an additional copy of the index data to its index cache 530. The data in the media management component index cache 530 may be generally stored on faster media, such as magnetic media, and is thus readily available to the system for use in storage operations and other activities without having to be first retrieved from the storage device 535.

Storage manager 500 may also maintain an index cache 505. Storage manager index data may be used to indicate, track, and associate logical relationships and associations between components of the system, user preferences, management tasks, and other useful data. For example, the storage manager 500 may use its index cache 505 to track logical associations between media agent 525 and storage devices 535. Index cache 505 may also keep track of replication copies and/or snapshots of replication copies. This may include replacing or pointing data agents and/or application directly to such snapshots for application restoration purposes as described above.

Storage manager 500 may also use its index cache 505 to track the status of storage operations to be performed, storage patterns associated with the system components such as media use, storage growth, network bandwidth, Service Level Agreement ("SLA") compliance levels, data protection levels, storage policy information, storage criteria associated with user preferences, retention criteria, storage operation preferences, and other storage-related information. Index caches 505 and 530 may typically reside on their corresponding storage component's hard disk or other fixed storage device.

For example, the jobs agent 510 of a storage manager component 500 may retrieve storage manager index 505 data regarding a storage policy and storage operation to be performed or scheduled for a particular client 585. Jobs agent 510, either directly or via the interface module 515, may communicate with the data agent 595 at the client 585 regarding the storage operation. In some embodiments, the jobs agent 510 may also retrieve from the index cache 505 a storage policy associated with the client 585 and uses information from the storage policy to communicate to the data agent 595 one or more media agent 525 associated with performing storage operations for that particular client 585 as well as other information regarding the storage operation to be performed, such as retention criteria, encryption criteria, streaming criteria, etc. The data agent 595 may then package or otherwise manipulate the client data stored in the client data store 590 in accordance with the storage policy information and/or according to a user preference, and communicates this client data to the appropriate media agent(s) 525 for processing. Media agent(s) 525 may store the data according to storage preferences associated with the storage policy including storing the generated index data with the stored data, as well as storing a copy of the generated index data in the media management component index cache 530.

In some embodiments, components of the system may reside and execute on the same computer. In accordance with other aspects of the invention, a client computer 585 component such as a data agent 595, a media agent 525, or a storage manager 500 may coordinate and direct storage operations as further described in application Ser. No. 09/610,738. This client computer 585 component can function independently or together with other similar client computer 585 components.

Figure 6:
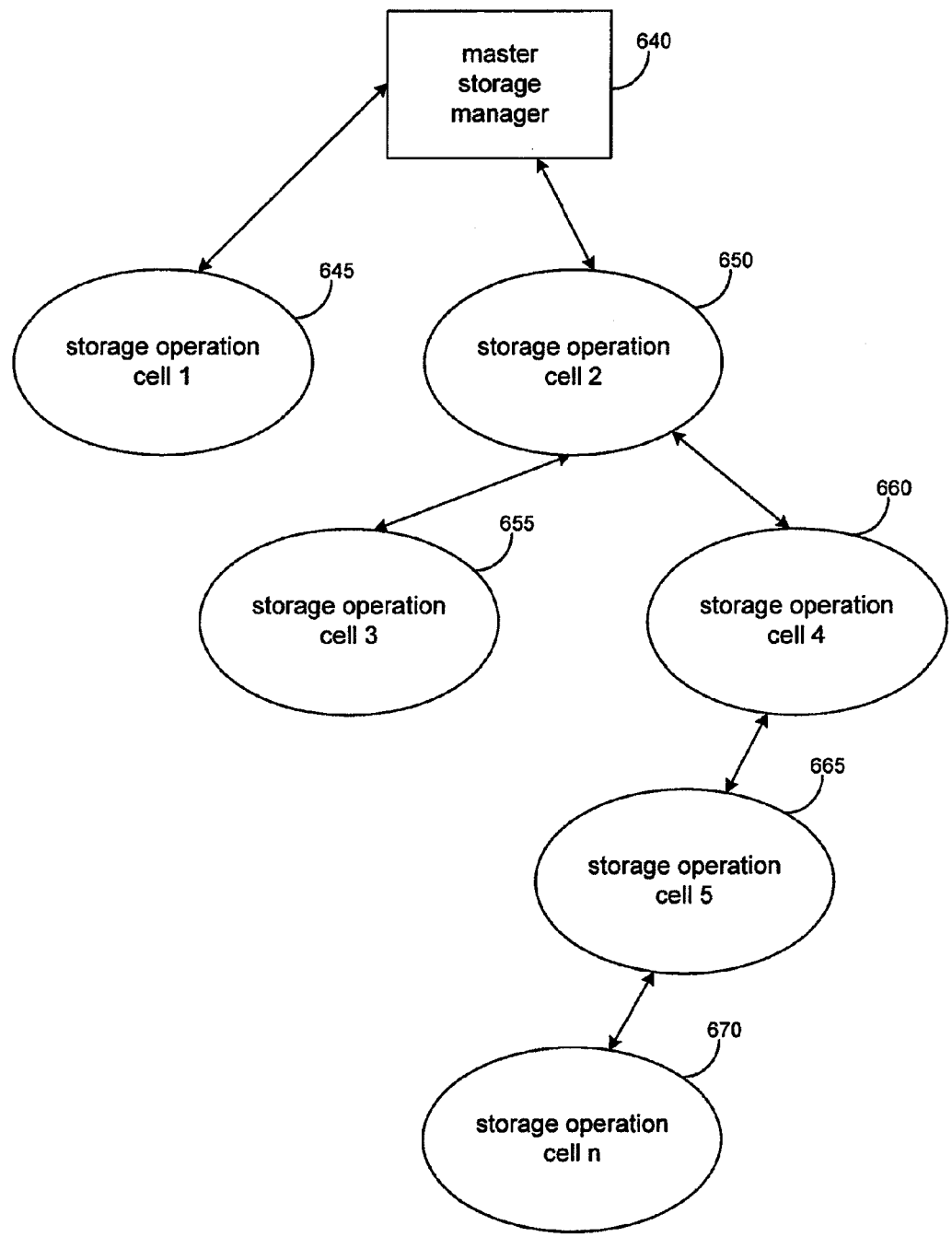
FIG. 6 is a block diagram of a hierarchically organized group of storage operation cells in a system to perform storage operations on electronic data in a computer network according to an embodiment of the invention.

FIG. 6 presents a block diagram of a hierarchically organized group of storage operation cells in a system to perform storage operations on electronic data in a computer network according to an embodiment of the invention. As shown, the system may include a master storage manager component 640, a first storage operation cell 645, a second storage operation cell 650, a third storage operation cell 655, a fourth storage operation cell 660, a fifth storage operation cell 665, and an nth storage operation cell 670.

As previously described, storage operation cells may often be communicatively coupled and hierarchically organized. For example, as shown in FIG. 2, master storage manager 640 may be associated with, may communicate with, and direct storage operations for a first storage operation cell 645, a second storage operation cell 650, a third storage operation cell 655, a fourth storage operation cell 660, a fifth storage operation cell 665, and an nth storage operation cell 670. In some embodiments, master storage manager 640 may not be part of any particular storage operation cell. In other embodiments (not shown), master storage manager 640 may itself be part of a storage operation cell.

Thus, master storage manager 640 may communicate with the management agent of the storage manager of the first storage operation cell 645 (or directly with the other components of the first cell 645) regarding storage operations performed in the first storage operation cell 645. For example, in some embodiments, the master storage manager 640 may instruct the first storage operation cell 645 how and when to perform storage operations, including the type of operation to perform, and the data on which to perform the operation.

In other embodiments, master storage manager 140 may track the status of its associated storage operation cells, such as the status of jobs, system components, system resources, and other items, by communicating with manager agents (or other components) in the respective storage operation cells. In other embodiments, master storage manager 640 may track the status of its associated storage operation cells by receiving periodic status updates from the manager agents (or other components) in the respective cells regarding jobs, system components, system resources, and other items. For example, in some embodiments, master storage manager 640 may use methods to monitor network resources such as mapping network pathways and topologies to, among other things, physically monitor storage operations and suggest alternate routes for storing data as further described herein. The master storage manager 640 may also use methods to monitor primary and secondary storage trends, storage status, media usage, data protection levels, and other storage-related information as further described herein.

In some embodiments, master storage manager 640 may store status information and other information regarding its associated storage operation cells and the system in an index cache or other data structure accessible to the master storage manager 640. In some embodiments, as further described herein, the presentation interface of the master storage manager 640 accesses this information to present users and system processes with information regarding the status of storage operations, storage operation cells, system components, and other information of the system.

Storage operation cells may be organized hierarchically. In this case, storage operation cells may inherit properties from their parents or be controlled by other storage operation cells in the hierarchy. Thus, in some embodiments as shown in FIG. 6, the second storage operation cell 650 controls or is otherwise superior to the third storage operation cell 655, the fourth storage operation cell 660, the fifth storage operation cell 665, and the nth storage operation cell 670. Similarly, the fourth storage operation cell 660 controls the fifth storage operation cell 665, and the nth storage operation cell 670.

Storage operation cells may also be organized hierarchically according to criteria such as function, geography, architectural considerations, or other factors useful in performing storage operations. For example, in one embodiment storage operation cells may be organized according to types of storage operations: the first storage operation cell 645 may be directed to performing snapshot or replication copies of primary copy data, and the second storage operation cell 650 is directed to performing backup copies of primary copy data, replication data or other data. For example, in another embodiment, the first storage operation cell 645 may represent a geographic segment of an enterprise, such as a Chicago office, and a second storage operation cell 650 represents a different geographic segment, such as a New York office. In this example, the second storage operation cell 650, the third storage operation cell 655, the fourth storage operation cell 660, the fifth storage operation cell 665, and the nth storage operation cell 670 may represent departments within the New York office. Alternatively, these storage operation cells may be further divided by function performing various types of copies for the New York office or load balancing storage operations for the New York office.

In some embodiments, hierarchical organization of storage operation cells facilitates, among other things, system security and other considerations. For example, in some embodiments, only authorized users may be allowed to access or control certain storage operation cells. For example, a network administrator for an enterprise might have access to all storage operation cells including the master storage manager 640. However, a network administrator for only the New York office, according to a previous example, may only satisfy access criteria for gaining access to the second storage operation cell 650, the third storage operation cell 655, the fourth storage operation cell 660, the fifth storage operation cell 665, and the nth storage operation cell 670 which may comprise the New York office storage management system.

In some embodiments, hierarchical organization of storage operation cells facilitates storage management planning and decision-making. For example, in some embodiments, a user of the master storage manager 640 may view the status of all jobs in the associated storage operation cells of the system as well as the status of each component in every storage operation cell of the system. The user can may then plan and make decisions based on this global data. For example, the user may view high-level reports of summary information regarding storage operations for the entire system, such as job completion status, component availability status, resource usage status (such as network pathways, etc.), and other information. The user may also drill down through menus or use other means to obtain more detailed information regarding a particular storage operation cell or group of storage operation cells.

In other embodiments, master storage manager 640 may alert the user when a particular resource is unavailable or congested. A storage device may be full or require additional media. Alternatively, a storage manager in a particular storage operation cell may be unavailable due to hardware failure, software problems, or other reasons. In some embodiments, master storage manager 640 (or another storage manager within the hierarchy of storage operation cells) may utilize the global data regarding its associated storage operation cells at its disposal to suggest solutions to such problems when they occur or before they occur (so a solution may be implemented prior to an anticipated problem). For example, the master storage manager 640 might alert the user that a storage device in a particular storage operation cell was full or otherwise congested, and then suggest, based on job and data storage information contained in its index cache, an alternate storage device.

Master storage manager 640 (or other network storage manager) may contain programming directed to analyzing the storage patterns and resources of its associated storage operation cells and which suggests optimal or alternate methods of performing storage operations. Thus, for example, master storage manager 640 may analyze traffic patterns in order to determine that snapshot data should be sent via a particular network segment or to a specific storage operation cell or storage device. In some embodiments, users may direct specific queries to master storage manager 640 regarding predicting storage operations or regarding storage operation information.

Figure 7:
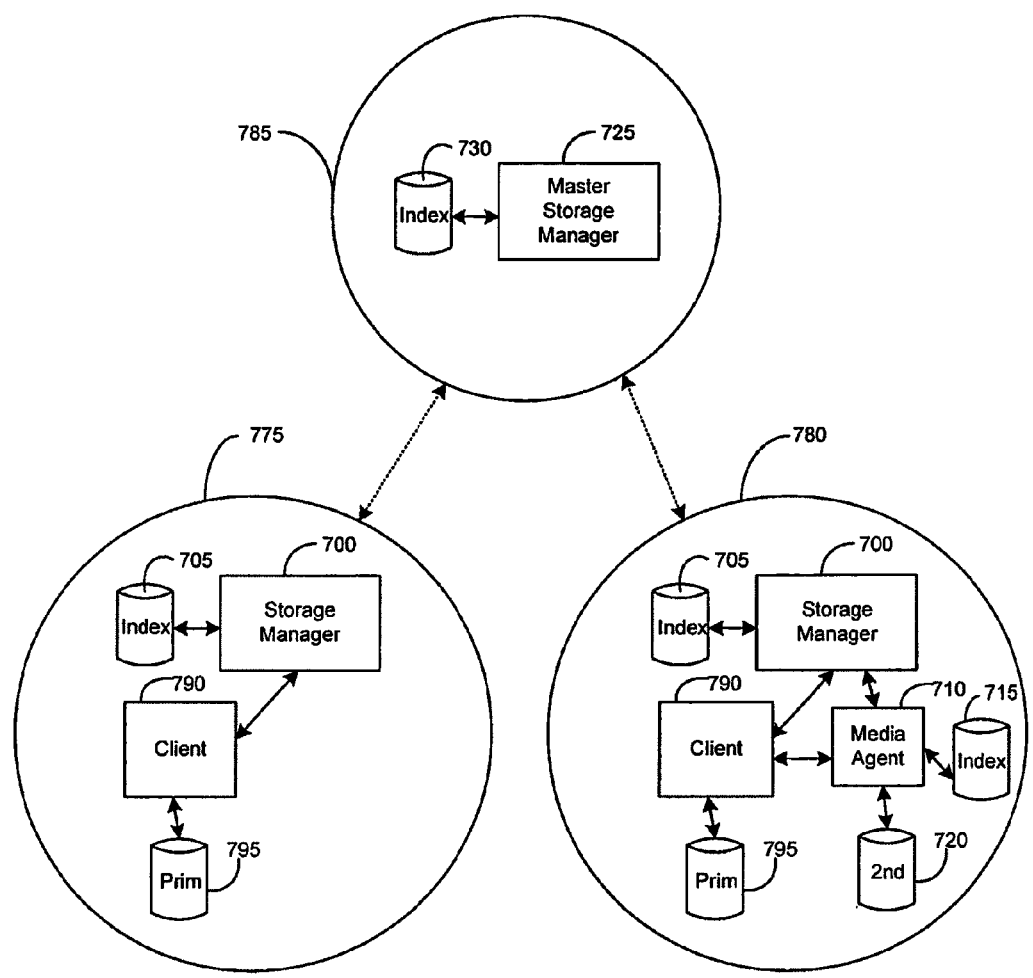
FIG. 7 is a block diagram of a hierarchically organized group of storage operation cells in a system to perform storage operations on electronic data in a computer network according to an embodiment of the invention.

FIG. 7 is a block diagram of a hierarchically organized group of storage operation cells in a system to perform storage operations on electronic data in a computer network according to an embodiment of the invention. As shown, FIG. 7 may include a first storage operation cell 775, a second storage operation cell 780, a third storage operation cell 785, a client 790 in communication with a primary volume 795 storing production or other "live" data, a storage manager component 700 in communication with a storage manager index data store 705, a media management component 710 in communication with a media management component index 715, a secondary storage device or volume 720, and a master storage manager component 725 in communication with a master storage manager index data store 730.

According to an embodiment of the invention, the first storage operation cell 775 may be directed to a particular type storage operation, such as SRM storage operations. For example, the first storage operation cell 775 may monitor and perform SRM-related calculations and operations associated with primary volume 795 data. Thus, the first storage operation cell 775 may include a client component 790 in communication with a primary volume 795 storing data. For example, client 790 may be directed to using EXCHANGE data, SQL data, ORACLE data, or other types of production data used in business applications or other applications and stored in primary volume 795. Storage manager component 700 in cell 775 may contain SRM modules or other logic directed to monitoring or otherwise interacting with attributes, characteristics, metrics, and other information associated with the data stored in primary volume 795. Storage manager 700 may track and store this information and other information in storage manager index 705. For example, in some embodiments, storage manager component 700 may track the amount of available space and other similar characteristics of data associated with primary volume 795. In some embodiments, as further described herein, storage manager component 700 may also issue alerts or take other actions when the information associated with primary volume 195 satisfies certain criteria, such as alert criteria.

The second storage operation cell 780 may be directed to another type of storage operation, such as HSM storage operations. For example, second storage operation cell 780 may perform backups, migrations, snapshots, or other types of HSM-related operations known in the art. For example, in some embodiments, data may be migrated from faster and more expensive storage such as magnetic storage to less expensive storage such as tape storage.

In some embodiments, storage operation cells may also contain logical groupings of the same physical devices. Thus, the second storage operation cell 780 may include client component 790 in communication with primary volume 795 for storing data, and client component 790 and primary volume 795 in the second storage operation cell 780 may be the same physical devices as the client component 790 and primary volume 795 in the first storage operation cell 775. Similarly, in some embodiments, storage manager component 700 and index 705 in the second storage operation cell 780 may be the same physical devices as the storage manager component and index in the first storage operation cell 775. Storage manager component 700 may, however, also contain HSM modules or other logic associated with second storage operation cell 780 that may be directed to performing HSM storage operations on primary volume 795 data.

The second storage operation cell 780, therefore, may also contain a media management component 710, a media management component index 715, and a secondary storage volume 720 directed to performing HSM-related operations on primary copy data. For example, storage manager 700 may migrate primary copy data from primary volume 795 to secondary volume 720 using media management component 710. Storage manager 700 may also track and store information associated with primary copy migration and other similar HSM-related operations in storage manager index 705. For example, in some embodiments, storage manager component 700 may direct HSM storage operations on primary copy data according to a storage policy associated with primary copy 795 and stored in index 705. In some embodiments, storage manager 700 may also track where primary copy information is stored, for example, in secondary storage 720.

The third storage operation cell 785 may contain a master storage manager 725 and a master storage manager index 730. In some embodiments (not shown), additional storage operation cells may be hierarchically located between the third storage operation cell 785 and the first storage operation cell 775 or the second storage operation cell 780. In some embodiments, additional storage operation cells hierarchically superior to the third storage operation cell 785 may also be present in the hierarchy of storage operation cells.

In some embodiments, the third storage operation cell 785 may also be directed to performing a type of storage operation, such as integration of SRM and HSM data from other storage operation cells, such as first storage operation cell 775 and second storage operation cell 780. In other embodiments, the third storage operation cell 785 may also perform other types of storage operations and may also be directed to HSM, SRM, or other types of storage operations. In some embodiments, the master storage manager 725 of the third storage operation cell 785 may aggregate and process network and storage-related data provided by other manager components 700 in other storage operation cells 775 and 780 in order to provide, among other information, reporting information regarding particular cells, groups of cell, or the system as a whole.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Moreover, it will be appreciated that the systems and methods provided herein are intended to exemplary and not limiting and that additional elements or steps may be added or performed in different order, if desired.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of correlating copies of application data of an operating software application in a storage system, the method comprising:
   populating a first data log with data associated with a plurality of software applications, where one or more entries in the first data log comprise at least an application type field;
   generating at least one indicator and an associated first time stamp, and placing the at least one indicator and associated first time stamp in the first data log;
   periodically copying portions of the first data log to a second data log;
   processing the second data log with a plurality of replication replay threads until the at least one indicator is reached, the replication replay threads replicate the data generated by the plurality of software applications to create replicated data, wherein each of the replication replay threads are associated with the plurality of software applications based on the application type field;
   associating a second time stamp with the replicated data; and
   associating the first time stamp with the second time stamp such that the data stored in the first data log is correlated with the replication data stored on the one or more first storage devices.

2. The method of claim 1 further comprising periodically copying the replication data stored on the one or more first storage devices to one or more second storage devices.

3. The method of claim 2 wherein the replication data is copied to the one or more second storage devices when the at least one indicator is encountered during a copy operation.

4. The method of claim 2 wherein copying of the replication data to the one or more second storage devices comprises taking a snapshot of the replication data on the one or more first storage devices.

5. The method of claim 4 wherein the snapshot of the replication data is associated with the first time stamp.

6. The method of claim 4 further comprising:
assigning a third time stamp to the snapshot; and
associating the third time stamp with the first time stamp such that the data stored in the first data log is correlated with the snapshot.

7. The method of claim 2 further comprising associating a location of the replication data stored on the one or more second storage devices with the first time stamp such that the data stored on the first data log becomes synchronized with the replication data stored on the one or more second storage devices.

8. The method of claim 2 further comprising copying location information associated with the replication data stored on the one or more second storage devices to an index.

9. The method of claim 1 further comprising:
suspending copy operations from the second data log to the one or more first storage devices when the at least one indicator is encountered; and
copying replication data from the one or more first storage devices to one or more second storage devices while the copy operations from the second data log to the one or more first storage devices are suspended.

10. The method of claim 1 wherein the at least one indicator is indicative of known recoverable state of one or more of the plurality of software applications.

11. A system of correlating copies of application data of an operating software application in a storage system comprising:
computer hardware that populates a first data log with data associated with a plurality of software applications, where one or more entries in the first data log comprise at least an application type field;
a software module installed on a computing device that generates at least one indicator and an associated first time stamp, and places the at least one indicator and associated first time stamp in the first data log;
computer hardware that periodically copies portions of the first data log to a second data log;
a computer hardware that processes the second data log with a plurality of replication replay threads until the at least one indicator is reached, the replication replay threads replicate the data generated by the plurality of software applications to create replicated data, wherein each of the replication replay threads are associated with the plurality of software applications based on the application type field;
computer hardware that associates a second time stamp with the replicated data; and
computer hardware that associates the first time stamp with the second time stamp such that the data stored in the first data log is correlated with the replication data stored on the one or more first storage devices.

12. The system of claim 11 wherein computer hardware periodically copies the replication data stored on the one or more first storage devices to one or more second storage devices.

13. The system of claim 12 wherein the replication data is copied to the one or more second storage devices when the at least one indicator is encountered during a copy operation.

14. The system of claim 12 wherein copying of the replication data to the one or more second storage devices comprises taking a snapshot of the replication data on the one or more first storage devices.

15. The system of claim 14 wherein the snapshot of the replication data is associated with the first time stamp.

16. The system of claim 14 further comprising computer hardware that assigns a third time stamp to the snapshot, wherein the third time stamp is associated with the first time stamp such that the data stored in the first data log is correlated with the snapshot.

17. The system of claim 12 further wherein computer hardware associates a location of the replication data stored on the one or more second storage devices with the first time stamp such that the data stored on the first data log becomes synchronized with the replication data stored on the one or more second storage devices.

18. The system of claim 12 wherein computer hardware copies location information associated with the replication data stored on the one or more second storage devices to an index.

19. The system of claim 11 further comprising:
computer hardware that suspends copy operations from the second data log to the one or more first storage devices when the at least one indicator is encountered; and
computer hardware that copies replication data from the one or more first storage devices to one or more second storage devices while the copy operations from the second data log to the one or more first storage devices are suspended.

20. The system of claim 11 wherein the at least one indicator is indicative of known recoverable state of one or more of the plurality of software applications.

* * * * *